US012684010B2

(12) United States Patent
Gill et al.

(10) Patent No.: US 12,684,010 B2
(45) Date of Patent: Jul. 14, 2026

(54) ENDPOINT AGENTS AND SCALABLE CLOUD ARCHITECTURE FOR LOW LATENCY CLASSIFICATION

(71) Applicant: Darktrace Holdings Limited, Cambridge (GB)

(72) Inventors: Arjun Singh Gill, Purley (GB); Maximilian Noka, Cambridge (GB); Davide Bernardi, Cambridge (GB); Robert Hutchinson, Nottingham (GB)

(73) Assignee: Darktrace Holdings Limited, Cambridge (GB)

( * ) Notice: Subject to any disclaimer, the term of this patent is extended or adjusted under 35 U.S.C. 154(b) by 613 days.

(21) Appl. No.: 18/207,059

(22) Filed: Jun. 7, 2023

(65) Prior Publication Data
US 2024/0121262 A1     Apr. 11, 2024

Related U.S. Application Data

(60) Provisional application No. 63/396,105, filed on Aug. 8, 2022, provisional application No. 63/350,781, filed on Jun. 9, 2022.

(51) Int. Cl.
*H04L 9/40* (2022.01)

(52) U.S. Cl.
CPC ........ *H04L 63/145* (2013.01); *H04L 63/0263* (2013.01); *H04L 63/1416* (2013.01); *H04L 63/1425* (2013.01); *H04L 63/1441* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 10,268,821 B2 | 4/2019 | Stockdale | |
| 10,419,466 B2 | 9/2019 | Ferguson et al. | |
| 10,701,093 B2 | 6/2020 | Dean et al. | |
| (Continued) | | | |

OTHER PUBLICATIONS

Karantzas et al. An empirical assessment of endpoint detection and response systems against advanced persistent threats attack vectors. Journal of Cybersecurity and Privacy 1.3 2021 387-421.

(Continued)

*Primary Examiner* — Haimei Jiang
(74) *Attorney, Agent, or Firm* — Rutan and Tucker, LLP

(57) ABSTRACT
A classifier detects anomalous activity and models a pattern of life of network entities through a series of machine learning models cooperating with multiple response and training instances, which are served by a scalable cloud platform that receives data associated with processes from multiple endpoint agents. The classifier spins up the multiple response instances to support the detection of anomalous activity through the series of machine learning models and the multiple training instances to support the creation and training of the series of machine learning models modeling of the pattern of life of network entities. The classifier spin ups the multiple response instances and the multiple training instances to automatically scale an amount of response instances and training instances needed to respond to a current data load of the data associated with the processes coming from the endpoint agents connected to the network.

20 Claims, 10 Drawing Sheets

(56) References Cited

U.S. PATENT DOCUMENTS

| | | | |
|---|---|---|---|
| 2014/0012959 A1 | 1/2014 | Round | |
| 2017/0270295 A1 | 9/2017 | Park et al. | |
| 2020/0244673 A1* | 7/2020 | Stockdale | G06N 20/00 |
| 2021/0127395 A1 | 4/2021 | Zhang et al. | |
| 2021/0273958 A1 | 9/2021 | McLean | |
| 2021/0273960 A1 | 9/2021 | Humphrey et al. | |
| 2022/0014533 A1 | 1/2022 | Almaz et al. | |
| 2022/0224724 A1* | 7/2022 | Bazalgette | H04L 63/1441 |

OTHER PUBLICATIONS

International Searching Authority, "The International Serch Report and the Written Opinion of the International Searching Authority, or the Declaration"; 2023-09-0; 51 pages.

* cited by examiner

ENDPOINT AGENTS AND SCALABLE CLOUD ARCHITECTURE FOR LOW LATENCY CLASSIFICATION

CROSS-REFERENCE

This application claims priority to and the benefit of under 35 USC 119 to U.S. provisional patent application titled "CYBER SECURITY TOOLS TO PROTECT A SYSTEM," filed Jun. 9, 2022, Ser. No. 63/350,781, which is incorporated herein by reference in its entirety. In addition, this application claims priority to and the benefit of under 35 USC 119 of U.S. provisional patent application titled "A CYBER THREAT PROTECTION SYSTEM," filed Aug. 8, 2022, Ser. No. 63/396,105, which is incorporated herein by reference in its entirety.

NOTICE OF COPYRIGHT

FIELD

Embodiments of the present disclosure generally relate to cyber security. More particularly, the embodiments relate to endpoint agents and classifying processes monitored by those endpoint agents.

BACKGROUND

In a cyber security environment, firewalls, endpoint security methods, and other detection and defense tools may be deployed to enforce specific policies and provide protection against certain threats on such an environment. These tools currently form an important part of an organization's cyber defense strategy, but they are insufficient in the new age of cyber threat. Similarly, these tools and strategies do not effectively protect against complex modern threats, such as employee 'insider' threats that are an ever-growing trend, as it is very difficult to spot malicious employees behaving inappropriately as they are integral to such an environment.

Moreover, due to the rise in smart, internet-connected devices and systems, the "digital estate" under the control or management of an enterprise has grown rapidly and created security blind-spots and artificial segregation of network visibility. Where previously it was sufficient to cover logical zones with cyber threat defense measures such as an office network, an email environment, and a production environment, enterprise networks increasingly contain additional independent systems like IoT devices or internet-connected smart systems such as vehicles or manufacturing equipment. These independent systems have uncommon protocol and data types for a traditional cyber protection system to analyze. On top of this, devices that could be cyber threat targets can also exist outside any of those networks or environments. (i.e., an employee's computing device connected to the internet but not through the office network) Commercial cyber threat defense systems are restricted to logical enterprise zones by the specialization and focus of their machine learning approach, which is not versatile enough to accommodate unseen data types and structures without significant development work. The lower-level protocols in a protocol stack also have widely varying data types that are different than those typically analyzed by most commercial third-party cyber security protection systems; thus, making them unusual protocols to be analyzed by a traditional cyber protection system.

SUMMARY

In an embodiment, an endpoint agent (e.g., client sensor cSensor) that extends network visibility in an endpoint computing device is discussed. A classifier can be configured to 1) detect anomalous activity associated with network entities and 2) model a pattern of life of network entities through a series of machine learning models cooperating with multiple response instances and training instances which are served by a scalable cloud platform that receives data associated with processes from multiple endpoint agents. Each endpoint agent can be configured to be resident on its own host endpoint computing device in a network being protected by a cyber security appliance against cyber threats.

The classifier can be configured to spin up 1) the multiple response instances to support the detection of anomalous activity associated with the network entities through the series of machine learning models and 2) the multiple training instances to support the modeling of the pattern of life of network entities by training the series of machine learning models. The classifier can be configured to spin up the multiple response instances and the multiple training instances to automatically scale an amount of response instances and an amount of training instances utilized to respond to a current data load of the data associated with the processes coming from one or more endpoint agents in the multiple endpoint agents that have their endpoint computing device connected to the network. The network devices, including endpoint computing devices, connected to the network can be protected against cyber threats by a cyber security appliance and the classifier on the scalable cloud platform.

The multiple response instances can be configured to classify and generate scores for events in the current data load of the data associated with the processes coming from one or more endpoint agents in the multiple endpoint agents; and subsequently, send information regarding the classification and scores for the events in the current data load of the data associated with the processes coming from the one or more endpoint agents to the cyber security appliance.

The response instance can be configured to use one or more of the machine learning models that model the pattern of life for the network entities, created by a training instance, for comparison in a process of the generation of the scores and making inferences. The response instance can be configured to load one or more of the machine learning models that model a pattern of life for the network entities from at least one of 1) a model storage database and 2) a cache that is part of the scalable cloud platform in order to analyze the current data associated with the all of the processes operating on that host endpoint computing device and to then generate scores for the events in the current data load of the data associated with the processes coming from the one or more endpoint agents that have their corresponding endpoint computing device connected to either the Internet and/or directly connected to the network.

These and other features of the design provided herein can be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
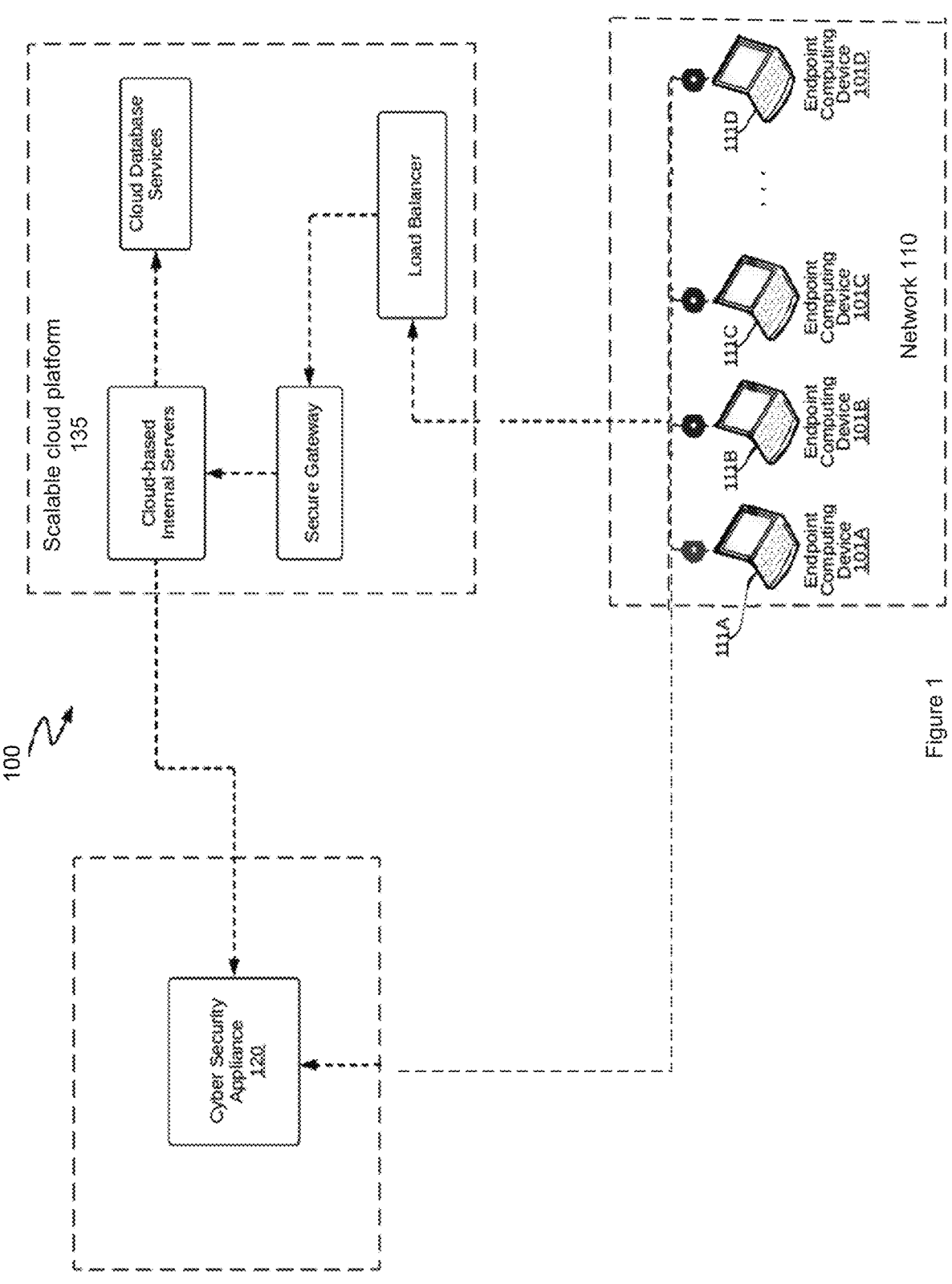
FIG. 1 illustrates a block diagram of an embodiment of an example cyber threat detection system that includes multiple endpoint agents and a scalable cloud platform.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In general, the embodiments described herein provide a cyber threat defense system having one or more endpoint agents (e.g., cSensors) configured to monitor network traffic, perform intelligent network functionalities, monitor processes operating on their host endpoint computing device, and extend network visibility for the cyber threat defense system.

A classifier can be configured to 1) detect anomalous activity associated with network entities and 2) model a pattern of life of network entities through a series of machine learning models cooperating with multiple response instances and training instances which are served by a scalable cloud platform that receives data associated with processes from multiple endpoint agents. Each endpoint agent can be configured to be resident on its own host endpoint computing device in a network being protected by a cyber security appliance against cyber threats.

The classifier can be configured to spin up 1) the multiple response instances to support the detection of anomalous activity associated with the network entities through the series of machine learning models and 2) the multiple training instances to support the modeling of the pattern of life of network entities by training the series of machine learning models. The classifier can be configured to spin up multiple response instances and multiple training instances to automatically scale to an amount of response instances and an amount of training instances needed to respond to a current data load of the data associated with the processes coming from one or more endpoint agents in the multiple endpoint agents that have their endpoint computing device connected directly to the network and/or indirectly through the Internet. Thus, the classifier scales the amount of response instances and training instances to respond to the current data load of the data associated with the processes coming from the endpoint agents that have their endpoint computing device connected directly to the network and/or indirectly through the Internet. The network devices, including endpoint computing devices, connected to the network can be protected against cyber threats by a cyber security appliance and the classifier on the scalable cloud platform.

The multiple response instances can be configured to classify and generate scores for events in the current data load of the data associated with the processes coming from one or more endpoint agents in the multiple endpoint agents; and subsequently, send information regarding the classification and scores for the events in the current data load of the data associated with the processes coming from the one or more endpoint agents to the cyber security appliance.

The response instance can be configured to use one or more of the machine learning models that model the pattern of life for the network entities, created by a training instance, for comparison in a process of the generation of the scores and making inferences. The response instance can be configured to load one or more of the machine learning models that model a pattern of life for the network entities from at least one of 1) a model storage database and 2) a cache that is part of the scalable cloud platform in order to analyze the current event data associated with the all of the processes operating on that host endpoint computing device and then to generate scores for the events in the current data load of the data associated with the processes coming from the one or more endpoint agents that have their corresponding endpoint computing device connected to either the Internet and/or directly connected to the network.

FIG. 1 illustrates an embodiment of an example block diagram of a cyber threat detection system that includes multiple endpoint agents and a scalable cloud platform. The cyber threat detection system 100 may include a series of endpoint agents 111A-D residing on endpoint computing devices 101A-D connected to the network 110, a cyber security appliance 120 located within the network 110 to monitor and protect network devices, including the endpoint computing devices 101A-D, connected to the network 110 and a scalable cloud platform 135.

The endpoint agents 111A-D monitors the endpoint computing devices' network activity and the endpoint computing devices' activity when not connected to the network. The endpoint agents 111A-D also monitor the individual processes (e.g., broadly a computer program e.g., Word, Excel, web browser, SaaS application, etc.) that is being executed, at least in part, on the endpoint computing devices 101A-D, and any data associated with that process. Thus, the endpoint agents 111A-D also monitor the individual processes resident and operating on the endpoint computing devices, and then delivers key data and metadata to the cyber security appliance 120 as well as to the scalable cloud platform 135 on both the individual process as well as on the network activity. The endpoint computing devices 101A-D can be used by, for example, remote workers. These endpoint agents 111A-D may be deployed to achieve a combination of greater and simpler visibility into IoT devices as well as remote workers working offline from the company network.

Note, the cloud platform can handle communications from endpoint agents residing outside the network 110 (i.e., outside the same network in which the appliance resides).

The endpoint agent 111 installed on a client device/endpoint computing device 101 also ingests network traffic passing to and from that device and performs some processing on that network traffic before sending it on (in packet or metadata form) as a second set of traffic data to a cyber security appliance located in a network. Note, this data can be first sent to the scalable cloud platform 135 which performs some processing on the data and then forwards that data to the cyber security appliance 120. The network traffic can include, for example, packets from browsing, a Remote Desktop connection (RDP), encrypted SSH packets, etc. The endpoint agent 111 can ingest network traffic from any of these sources because it is resident within the endpoint device and perform deep packet inspection (DPI) on the traffic (1) to derive metadata and pass on only the metadata (i.e., "Full DPI") (e.g., HTTP traffic); (2) perform DPI on just parts of the connection and pass that metadata onward ("Partial DPI") (e.g., HTTPS traffic); or (3) process and forward all traffic to the secondary location ("No DPI") (e.g., Kerberos traffic) simple mirroring of information. Likewise, the endpoint agent 111 installed on a client device/endpoint computing device 101 ingests process data on individual processes operating on the endpoint computing device 101. The endpoint agent 111 then sends a selected/filtered set of event data associated with the processes resident on the endpoint computing device 101. The endpoint agents 111A-D may also be configured to perform autonomous actions, such as stopping certain traffic (and any other desirable actions based on the client needs, network infrastructures, and such) and/or killing individual processes operating on the endpoint device, in response to instructions from the cyber security appliance 120 and/or autonomous response actions configured into the endpoint agent 111 itself.

Figure 2:
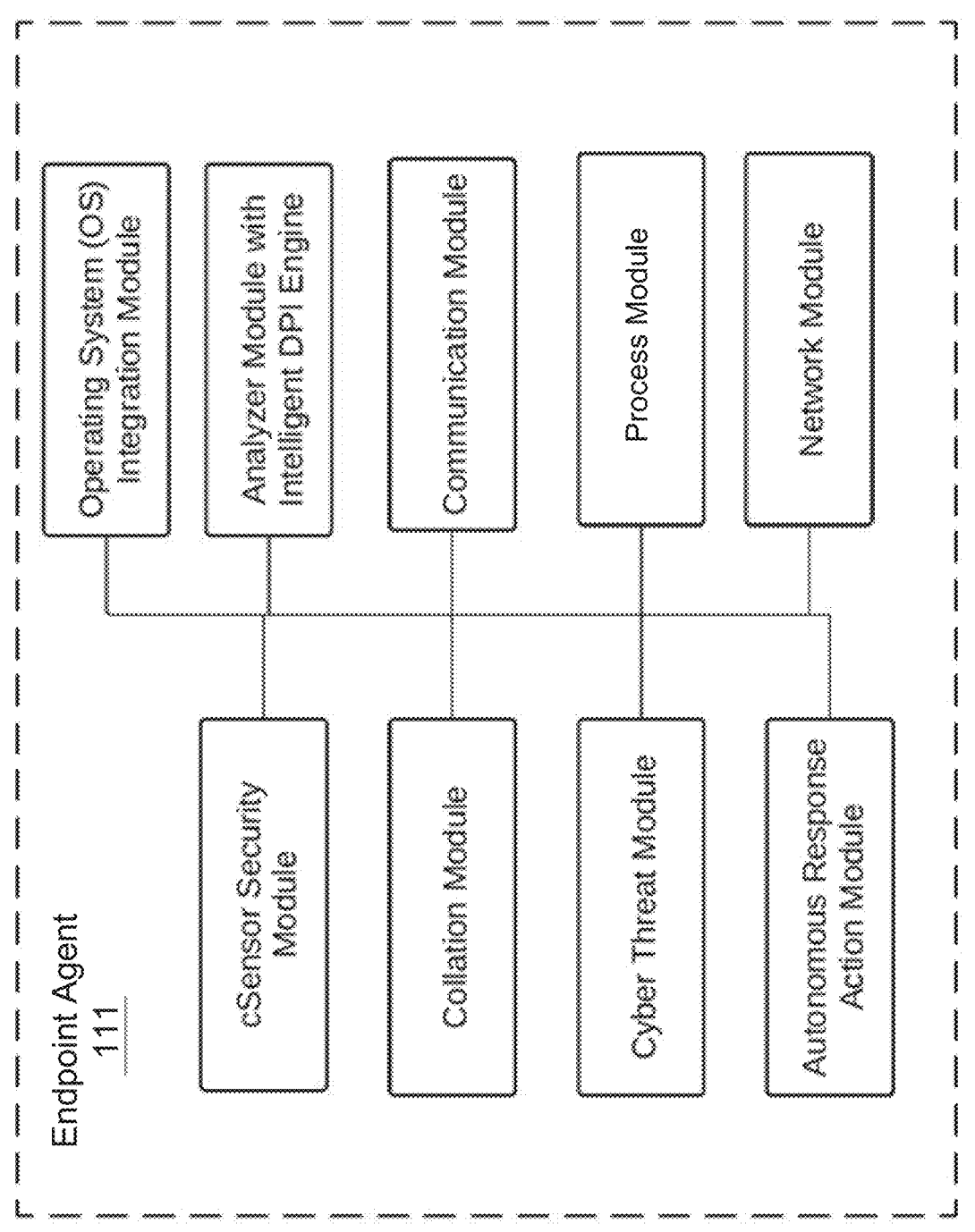
FIG. 2 illustrates a block diagram of an embodiment of an example endpoint agent and one or more modules utilized by the endpoint agent.

FIG. 2 illustrates a block diagram of an embodiment of an example endpoint agent and one or more modules utilized by the endpoint agent 111A. With regard to the discussion of FIG. 1, FIG. 2 similarly depicts an example endpoint agent and the one or more modules utilized by the endpoint agents 111A-D. The endpoint agent 111A may comprise a process module configured to monitor processes operating and resident on the endpoint computing device as a first set of process data. A security module of the endpoint agent 111 can have an interface to cooperate with and integrate with an operating system (OS) of the endpoint computing device. The endpoint agent 111A may also include a network module configured to monitor network information coming into and out of the endpoint computing device as a first set of traffic data. The network module can also cooperate with other network entities such as virtual sensors (e.g., vSensors, osSensors, etc.) to ingest a first set of traffic data from one or more network connections between any of the network entities. The endpoint agent 111A may further include a communication module to send the events from the first set of process data identified by the process module. The communication module is configured to transmit the first set of process data securely to a classifier on a scalable cloud platform. The endpoint agent 111A may further include a collation module configured to collect the first set of traffic data and subsequently obtain input data associated with various observed events from the first set of traffic data. In an embodiment, the endpoint agent 111A may include an analyzer module to receive the input network data and to implement an intelligent DPI engine that may perform one or more predetermined levels of DPI on the input data based on various network parameters. The communication module can also transmit a second set of traffic data securely to a cyber security appliance in the cyber threat defense system. The transmitted second set of traffic data is associated with the specified DPI performed on the input data. Lastly, as discussed in greater detail in the embodiments below, the endpoint agent 111A may have an autonomous action module configured to perform autonomous action(s) that are correlated to at least one of the first set of traffic data received by the endpoint device, the second set of traffic data received by the cyber security appliance, and/or the first set of process data. Note, the autonomous action module triggered by a preset condition in the autonomous action module in the endpoint agent 111A and/or by a command sent by the cyber security appliance in the network.

The endpoint agents 111A, by extending visibility to endpoint computing devices even when they are disconnected from the network, these endpoint agents 111A enable the cyber threat defense system to cover branch offices and remote workers working on endpoint computing devices off the network (such as an organization's virtual private networks (VPNs). In addition, a light version of an endpoint agent 111A can be employed in an endpoint computing device such as an IoT device that has less computing power than an endpoint computing device of a laptop computing device. As such, the endpoint agents 111A can be deployed on a range of managed endpoint devices. This, therefore, allows the systems to analyze real-time network traffic, for example, of remote workers working on an endpoint device, in the same way the cyber security appliance 120 analyzes network traffic and its meta data in its network by correlating a web of connections to develop an evolving understanding of workforce behavior. Furthermore, these endpoint agents (e.g., cSensors) described herein provide much-needed visibility of suspicious activities occurring when the network entity is off the VPN, for example, from cyber threats malicious agents—advanced persistent threats (APTs) such as latent strains of malware that could move laterally when employees reconnect to the network, insider threats and compliance issues. The obtained input data can include a variety of observed network events implemented by the respective network entities as well as identities of a computer process running (e.g., executable files resident) in the endpoint receiving and sending the first set of traffic currently under analysis.

The process module may monitor and communicate when certain events occur in the processes on the endpoint device. The process module may generate a refined/filtered set of process data on events in the process data into a first set of process data. A collation module can cooperate with the security module and the process module to obtain input data from the collected first set of traffic data and the first set of process data. The additional collected information can include, for example, an identity of an individual computing process running in the endpoint computing device that is sending the first set of traffic data and/or receiving the first set of traffic data, details about the individual processes, as well as details about the network traffic received and sent by that endpoint device.

An analyzer module can have an intelligent DPI (deep packet inspection) engine to receive the input data from the first set of traffic data being transmitted via the respective network connection. The intelligent DPI engine is configured to perform one or more predetermined levels of DPI from its two or more possible levels of DPI on the input data based on one or more network parameters. A communication module is configured to transmit a second set of traffic data to a cyber security appliance in the network. The transmitted second set of traffic data is associated with the specified DPI performed on the input data from the first set of traffic data (e.g., DPI on all or some of the meta data and/or simple mirroring—no DPI). An autonomous action module resident in the endpoint agent itself is configured to perform one or more autonomous actions. In an embodiment, the autonomous action can be triggered by command sent by the cyber security appliance. The triggered autonomous action may come from the cyber security appliance in the network which has enough processing power to recognize a potential cyber threat and determine a correct autonomous response to take and send the response command to the endpoint agent resident in the endpoint computing device such as an IoT device. The autonomous action can be correlated to at least one of 1) the first set of traffic data received by the endpoint device, 2) the second set of traffic data sent by the endpoint device, 3) the first set of process data, and/or 4) combinations of these.

The autonomous actions comprise at least one or more of blocking a particular connection, blocking a particular type of traffic data, preventing a particular type of activity, cooperating with the operating system to shut down or quarantine one or more computer processes running on the endpoint computing device, and other similar network preventative actions.

The coordinator module can correlate one or more causal links between the collected network activity data from the network entities as well as the process data that is associated with the network activity.

A security module is configured to have an interface, such as an API, driver, etc. to cooperate with and integrate with an operating system (OS) of the endpoint computing device. The security module can cooperate with the network module and the process module to assist the linking of network information with executable files/computing processes in the endpoint client device. The security module cooperating with the process module can monitor and collect specified data from multiple computing software processes executing on this endpoint device. The types of network activities transmitted can include at least one or more of network connection activities, data transfer activities, and/or behavior pattern activities.

In some endpoint devices that have a lot of memory and processing power, the endpoint agent 111A may have a cyber threat module. The cyber threat module is configured to detect potentially unusual network activity in order to provide an additional input of information in conjunction with the transmitted specified data. For example, the cyber threat module is configured to generate a score or probability score corresponding to a level of detected potential cyber threat. Thus, the cyber threat module generates a score or probability corresponding to a level of how harmful a detected potential cyber threat is maliciously harmful to the endpoint computing device. In some endpoint devices that have a lot of memory and processing power, the endpoint agent 111A may have one or more machine learning models cooperating with the rest of the modules, such that these machine learning models are trained on a normal pattern of life of various network, behavior, and/or data activities within the network. When the excess memory and processing power is not available in an endpoint computing device, then 1) the cyber security appliance can house and run the machine learning models for the network activity and 2) a classifier on the scalable cloud platform can be used to analyze and process the event data for the processes on endpoint computing device.

Figure 3:
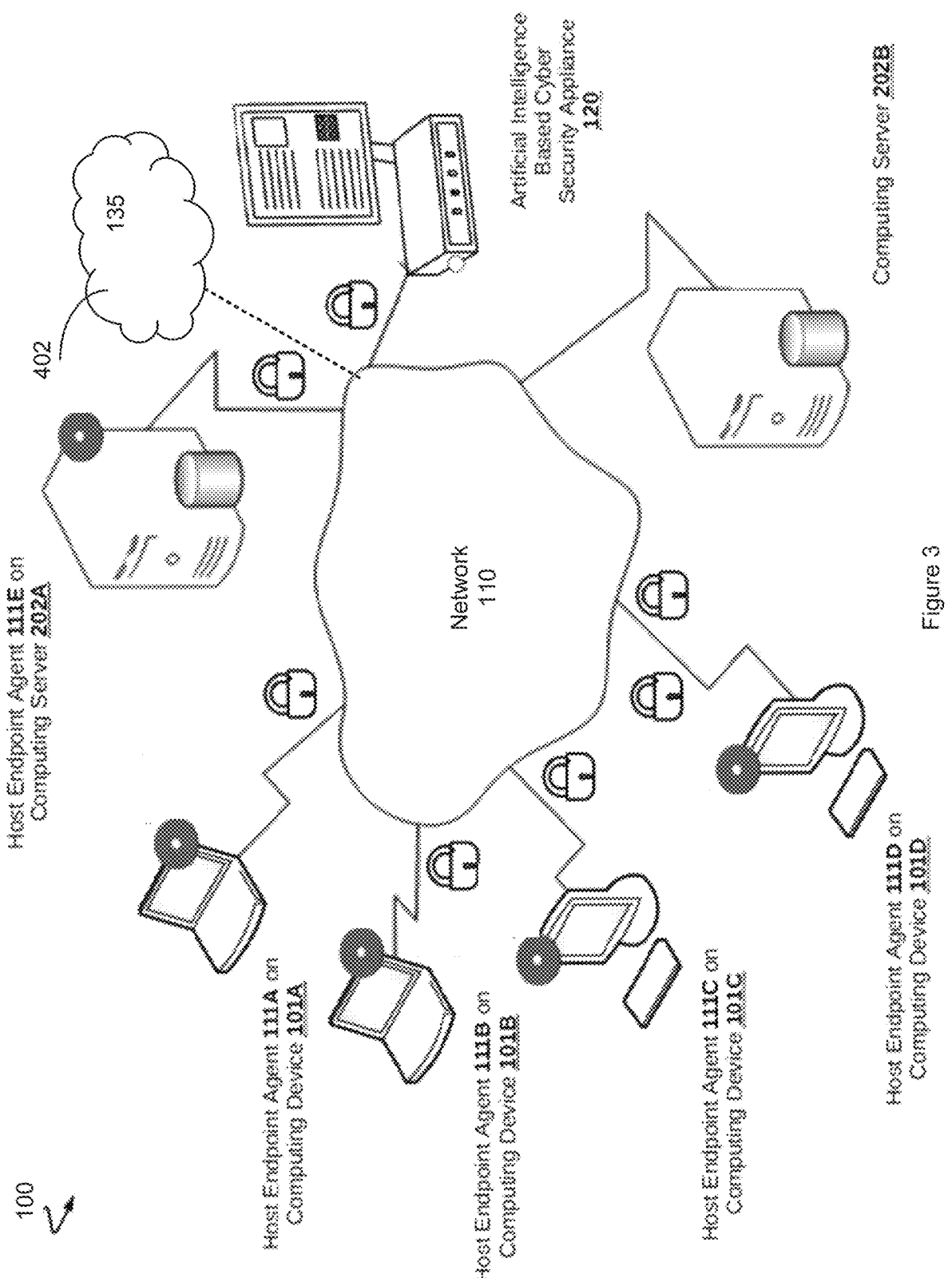
FIG. 3 illustrates a block diagram of an embodiment of example host endpoint agents on endpoint computing devices communicatively coupled with a cyber security appliance and a classifier on a scalable cloud platform.

FIG. 3 illustrates a block diagram of an embodiment of example host endpoint agents on endpoint computing devices communicatively coupled with a cyber security appliance and a classifier on a scalable cloud platform. The cyber threat detection system 100 may use the cyber security appliance 120, depicted in FIG. 6, and the classifier 402 on the scalable cloud platform 135, depicted in FIGS. 4 and 5, to cooperate with the endpoint agents 111A-E on their respective endpoint computing devices 101A-D and servers 202A and 202B via the secure communication channels established with the network 110. The cyber threat detection system 100 depicted in FIG. 3 may be substantially similar to the cyber threat security system 100 depicted in FIG. 1.

The cyber security appliance 120 can cooperate as discussed herein with the endpoint agents 105A-D residing on their respective endpoint computing devices 101A-D and servers 202A-B to communicate, for example, receive any collected pattern of life data, process data, network data, etc. for that network entity. The cyber security appliance 120 can communicatively couple to the network 110, endpoint computing devices 101A-D and servers 202A-B via a secure channel, such as through port 443 so a firewall exception is not needed.

In some embodiments, the network 110 may be: (i) an information technology network, (ii) an operational technology network, (iii) a cloud infrastructure, (iv) a SaaS infrastructure, and/or (v) any combination thereof capable of being communicatively coupled to each of the respective endpoint computing devices and servers 101A-D and 202A-B. The endpoint computing devices 101A-D can communicatively couple to the classifier 402 on the scalable cloud platform 135.

In some embodiments, the endpoint agents 111A-D are configured to: (i) have a low system impact on the end-point computing-device and run without degrading the endpoint computing-device performance significantly; (ii) monitor the "pattern of life" of the end-point computing-device, its processes, such as Outlook, Word, etc., its users, events on that device, etc. This at least includes: (a) process behavior (use of network, filesystem, etc.), (b) relationships between processes (parent/child, shared files, IPC), and (c) user behavior (applications commonly used, IT habits); (iii) make reports on pattern of life metadata, events and alerts to an API whenever connected to the Internet and/or the network, and while offline, cache data to deliver when possible; (iv) assist in performing IT audits while also completing pattern of life data and events (e.g., the following list is illustrative and should not be considered exhaustive: (a) audit system details, for example installed operating systems, installed software, software versioning, security update status; (b) gather system usage activity such as shutdown periods, login failures, file modifications, network connections, etc.; and (c) record use of external devices or transfer protocols (e.g., USB usage, Bluetooth usage, email usage, etc.); and (v) autonomously react to anomalies in pattern of life: (a) cooperate with the appliance 120 with its significantly greater processing power, sets of models including, for example, pulling when available, any actions to be taken and/or be able to take a limited set of actions when a connection to the cyber security appliance 120 is not available; (b) provide an operator with the ability to enable the end point agent 111 to perform a select number of relatively simple actions when predefined conditions of suspicious behavior and/or anomaly level are met, independent of the cyber defense appliance; and (c) example actions may include, but are not limited to, prompt user, quarantine a suspicious process (from network access and process as well as internal computing device's process and filesystem), shutdown the offending processes, and others.

Each host endpoint agent 111A-E resident on it host endpoint computing device may use the collections module to cooperate with two or more other sensors (or probes) that include, but are not limited to, at least: (i) a first type of probes specifically configured to collect data from an operating system of its respective endpoint computing devices/server 101A-D/202A; (ii) a second type of probes specifically configured to collect data from each individual process executing on that endpoint computing devices/server 101A-D/202A; and (iii) a third type of probe configured to collect system event and logging data from that endpoint computing devices/server 101A-D/202A. The collections module may cooperate with one or more of the third type of probes to monitor and record other types of events occurring on those endpoint computing devices/server 101A-D/202A. The collected data from the operating system and individual processes along with the recorded other events may be sent in the collected pattern of life data by the collation module to the cyber security appliance 120 and the classifier 402.

The pattern of life data gathered by the first type of probes may include, for example, installed applications, software versions, operating system and pending security updates. The pattern of life data gathered by the second type of probes on individual processes themselves may include associations between parent and child processes, network connectivity and process interaction, file system interaction, process startup and shutdown, etc. Lastly, the third type of probe may detect and record other events with event logging tools. This probe may gather other events such as, for example, connections to new Wi-Fi or wired networks, interaction with peripheral devices (including, but not limited to, universal serial bus, visual displays, etc.) and system usage events such as power management, file modification, etc.

Again, the host endpoint agent 111 may have an autonomous action module that causes one or more autonomous actions to be taken to contain the cyber threat when detected and when: (i) that endpoint agent is not connected to the network 110 where the appliance 120 is installed, (ii) the appliance 120 is unavailable to communicate with the endpoint agent, and/or (iii) any combination of (i) and/or (ii) occur. Note, the endpoint agent does not need to be connected to the corporate network, just the Internet to communicate with the classifier 402. The endpoint agents can send data to the cloud platform from outside a corporate network 110 as long as they are connected to the Internet. The autonomous action module located in that endpoint agent may take one or more autonomous action actions preapproved by a human user when predefined conditions of suspicious behavior and/or anomaly level are met, independent of the appliance 120 to autonomously attempt to contain the potential cyber threat. Again, the autonomous action module, rather than a human taking an action, may be configured to cause one or more autonomous actions to be taken to contain the cyber threat when a potential cyber threat is detected. Note, the cyber security appliance 120 may have the autonomous action module, and/or one or more portions of the autonomous action module may exist on that host endpoint agent, while the majority portion may remain on the cyber security appliance 120 due to greater processing power. A user programmable interface hosted on the appliance 120 may have, any of, fields, menus, and icons that are configured to allow a user to preauthorize the autonomous action module to take actions to contain and/or respond to the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device. Thus, the user programmable interface has the granularity in options available to the user to program the autonomous action module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Classifier

Figures 3, 4:
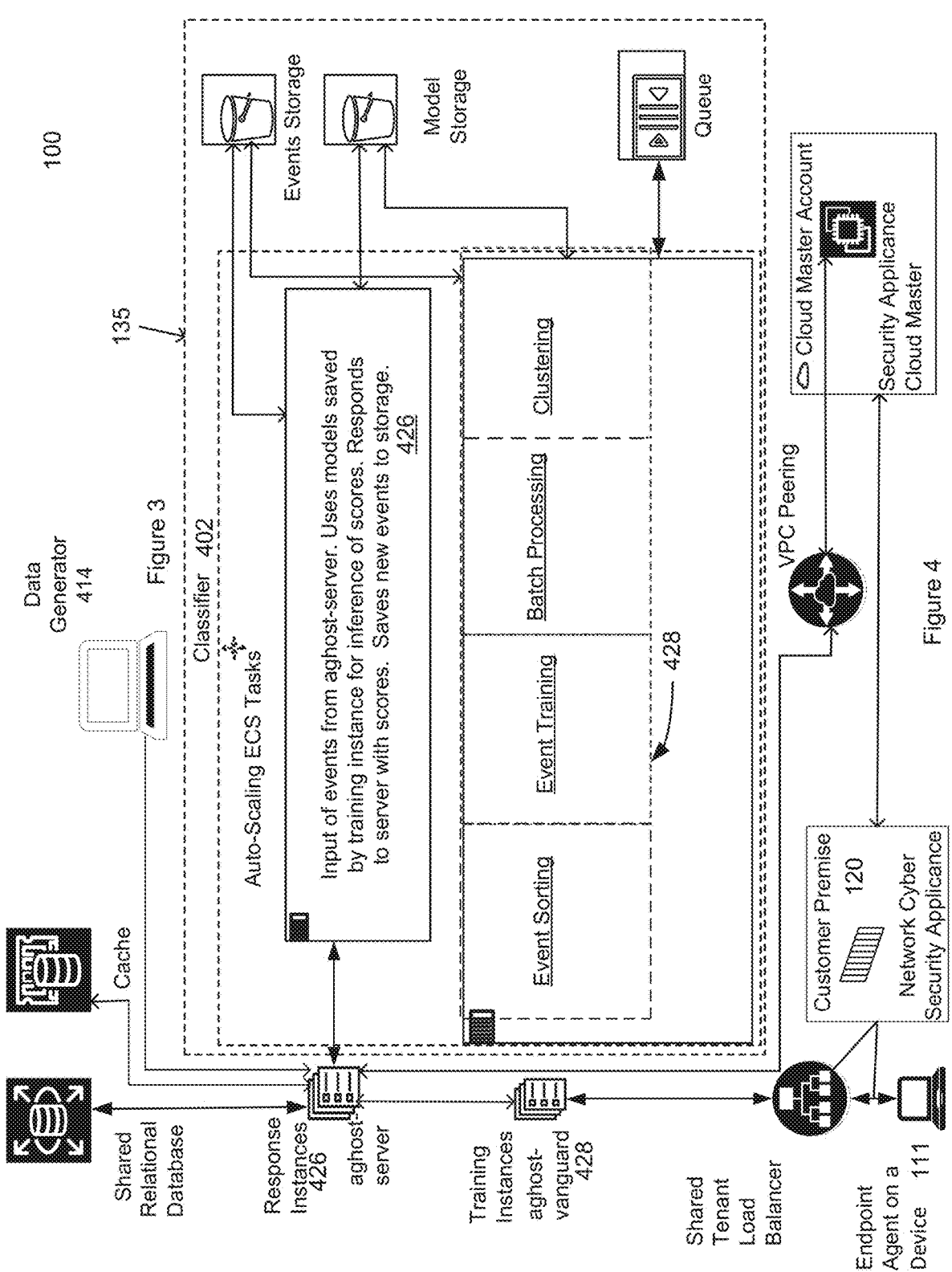
FIG. 4 illustrates a block diagram of an embodiment of an example classifier to 1) detect anomalous activity and 2) model a pattern of life of network entities through a series of machine learning models cooperating with multiple response and training instances which are served by a scalable cloud platform that receives data associated with processes from multiple endpoint agents.

FIG. 4 illustrates a block diagram of an embodiment of a classifier to 1) detect anomalous activity and 2) model a pattern of life of network entities through a series of machine learning models cooperating with multiple response and training instances which are served by a scalable cloud platform that receives data associated with processes from multiple endpoint agents. The classifier 402's architecture can include multiple response instances, multiple training instances, an events storage database, a source observers storage database, a series of machine learning models, and a communications module, and other similar components, to make inferences and generates scores for the data associated with the processes coming from one or more endpoint agents. The classifier 402 and scalable cloud platform 135 can form a valuable part of the cyber threat detection system 100. In an embodiment, communications for events storage is write only for the response instance and model storage is read only. In an embodiment, communications for events storage and model storage for the response instance is bidirectional.

The classifier 402 can be configured to 1) detect anomalous activity and 2) model a pattern of life of network entities through a series of machine learning models cooperating with multiple response and training instances 428 which are served by a scalable cloud platform 135 that receives data associated with processes from multiple endpoint agents, where each endpoint agent 111 is configured to be resident on its own host endpoint computing device 101 in a network 110 being protected by a cyber security appliance 120 against cyber threats.

The classifier 402 is configured to spin up the multiple virtual response instances 426 and the multiple virtual training instances 428 to automatically scale an amount of virtual response instances 426 and an amount of virtual training instances 428 utilized to respond to a current data load of the data associated with the processes coming from one or more endpoint agents in the multiple endpoint agents that have their endpoint computing device 101 connected to the network 110 protected by a cyber security appliance 120 against cyber threats.

With this scalable cloud platform 135, as the amount of input data grows arbitrarily, all the classifier 402 in the scalable cloud platform 135 needs to do is increase the amount of response and training instances 428 that the classifier 402 has running at the same time. The classifier 402 uses the response and the training instances 428 to be scalable so that the classifier 402 can handle the processing of the current data load of the data associated with the processes coming from the endpoint agents connected to the network 110.

The endpoint agent 111 resident in the host endpoint computing device 101 records events occurring in the processes including launches, closings, connections, etc. of processes occurring. The endpoint agent 111 resident in the host endpoint computing device 101 is configured to collect the events occurring in the processes both when the host endpoint computing device 101 is not connected to the corporate network 110 as well as when the host endpoint computing device 101 is connected to the corporate network 110. Each endpoint agent 111 in the multiple endpoint agents is configured to monitor processes operating on its corresponding host endpoint computing device 101 processes events including launches of processes in the host endpoint computing device 101 and then store the data associated with the processes in a non-transitory memory in that host endpoint computing device 101 until the endpoint agent 111 determines that the host endpoint computing device 101 is connected to the Internet, such that the endpoint agent 111 collects the data associated with the processes operating on its host endpoint computing device 101 both when the host endpoint computing device 101 is not connected to the corporate network 110 as well as when the endpoint computing device 101 is connected to the corporate network 110 protected by the cyber security appliance 120 against cyber threats. The endpoint agent can forward on the data as long as it is connected to the Internet in general. The endpoint agent merely temporarily stores the data when connected the Internet and forwarding the data. The endpoint agent stores the data on a longer-term basis when not connected to the Internet. When the endpoint agent 111 resident in the host endpoint computing device 101 is connected to the Internet, including when connected to the corporate network 110, then the endpoint agent 111 feeds that process data to the scalable cloud platform 135 with its classifier 402 through the shared tenant load balancer. The load data for processes operating on or with the host endpoint computing devices from the host endpoint computing devices is sent through the shared tenant load balancer in order to analyze process data including connection data in order to detect the anomaly.

The classifier 402 on the scalable cloud platform 135 scales with the data load which includes factors such as the amount of host endpoint computing devices connecting to the scalable cloud platform 135, the volume of data being supplied into the scalable cloud platform 135 during a window of time from the overall amount of devices, a minimum latency allowed for data on events in the processes in the data load, etc. The data on events in the processes is passed to a secured gateway/vanguard. The secured gateway/vanguard forwards the data on events in the processes onto the server. Note, the scalable cloud platform 135 can have the server and/or each endpoint agent 111 itself filter by looking for specific types of events and reformatting the event data of interest. The classification of process data can be partially completed in the endpoint agents and partially completed in the scalable cloud platform 135 to create as low of a computing and memory footprint as possible on the endpoint agent. The server can send the filtered event data in its consistent format to the classifier 402 architecture and its components.

The classifier 402 spins up the multiple response instances 426 to automatically scale an amount of response instances 426 utilized to respond to a current data load of the data.

A key concept is that inference happens inside multiple stateless load-balanced "response" instances, while training happens somewhere else entirely, inside multiple "training" instances. The response instances 426 and the training instances 428 do not have to communicate directly with each other but rather can communicate with each other through a cache/queue, a shared relational database, and/or a set of databases. The response instances 426 and training instances 428 may communicate via the events storage database and the model storage database. The events storage database stores all of the data that the system has for 1) each particular host endpoint computing device, 2) each particular user, and 3) groups of host endpoint computing devices in the network 110. The model storage database can store all of the models and model information. The response instances 426 and training instances 428 may be stateless, independent of each other, that the classifier 402 can scale to have as many response instances 426 as it needs running because the classifier 402 can always load up as many instances of the particular relevant model for that endpoint computing device 101 as needed to process the events in the process data in parallel. Each instance of response instance 426 can cooperate with its own instance of machine learning model that models the pattern of life for that particular network entity (e.g., endpoint computing device, user, etc.), where all of the instances can process the overall data load for that endpoint computing device 101 amongst a current pairing of response instance 426 and the instance of the machine learning model that models the pattern of life for that particular network entity. All of this parallel processing can create very low latency times in evaluating the entire current data load. Likewise, the current data load for all of the different endpoint computing devices, laptops, remote desktop connections, smartphones, tablets, etc., connecting to the scalable cloud platform 135 can be processed with parallel processing with the pairing of instances of response instances 426 and instances of machine learning models that model the pattern of life for that particular network entity.

The classifier 402 in the scalable cloud platform 135 can spin up the multiple virtual response instances 426 and the multiple virtual training instances 428 so that the multiple virtual response instances 426 can quickly respond to the data associated with the processes coming into the scalable cloud platform 135 independently from an ability of the multiple virtual training instances 428 to at least one of i) build and ii) update the machine learning models that model a pattern of life for the network entities in the network 110 with the data associated with the processes. In parallel, the training instances 428 can analyze the multiple endpoint computing devices themselves and their resident processes to create one or more clusters of host endpoint computing devices that have similar processes resident on their corresponding host endpoint computing device 101 to generate even better scores from the machine learning in its future analysis.

In addition, the response and training instances 428 are configured to scale independently and work independently because the process of model building and training can take a long time. The classifier 402 latency requirements can be set by default and/or enhanced with settings by a user and the classifier 402 needs to have the capability to respond with a low latency at any given time. The classifier 402 can build as many response instances, as many training instances 428 as needed by scaling and use of parallel processing with instances of virtual response instances, virtual training instances, and instances of machine learning models that model the pattern of life for the network entities which the response instances 426 use for comparisons. With the classifier 402 in the scalable cloud platform 135, as the amount of input data grows arbitrarily, and/or an amount of machine learning models that need updated training and/or building, all the classifier 402 needs to do is increase the amount of response and training instances 428 that it has running at the same time. The requirements of latency and/or other characteristics associated with handling the data loading and/or model training can be set by default and/or enhanced with settings inputted by a user.

Overall, the classifier 402 in the scalable cloud platform 135 uses a low latency classification to classify process data that is received and evaluated from lots of endpoint agents. Inferences of what is anomalous and what isn't anomalous can happen inside multiple stateless load-balanced "response" instances, while training can happen somewhere else entirely, inside multiple "training" instances. These response and training instances 428 can each run in their own container or in a common container under a single operating system depending upon implementation. Thus, the scalable cloud platform 135 can run training instances 428 and response instances 426 simultaneously.

In an embodiment, the classifier 402 in the scalable cloud platform 135, such as Amazon Web Services, spins up virtual response instances 426 and/or virtual training instances, as, for example, an Elastic Container Service (ECS) task, Elastic Kubernetes Service (EKS) pod, a Fargate task, etc., and requests sent by the server regarding the data associated with processes from multiple endpoint agents are load balanced. The container service orchestration platform can be utilized by the classifier 402 to run, stop, and manage virtual instances, such as the virtual response instances 426 and virtual training instances, in containers. Again, the current data load (e.g. amount of requests/coming in, the latency priority associated with the data load coming in, etc.) will cause, for example, an amount of response instances, as for example ECS tasks, to scale to handle the response analysis for the data load as well as an amount of an amount of training instances, as for example ECS tasks, needed to update and/or build machine learning models that model a pattern of life for the network entities.

As discussed, one or more models may be a self-learning machine learning model trained on a normal pattern of life of each network entity. The self-learning model of normal pattern of life is then continuously updated with the actual behavior of that network entity. The self-learning model of normal pattern of life is updated when new input data is received. The analyzed metrics received from the endpoint agents can be compared to a moving benchmark of parameters that correspond to the normal pattern of life for the computing system used by the self-learning model. Accordingly, the analyzed metrics and the moving benchmark used by the self-learning model of normal behavior of the entity, can be used in determining an anomaly score, which can be indicative of a likelihood of a harmful cyber threat and its severity. Note, a normal behavior threshold may be used by the models as the moving benchmark of parameters that correspond to a normal pattern of life for the entities. The normal behavior threshold is varied according to the updated changes in the computer system allowing the model to spot behavior on the computing system that falls outside the parameters set by the moving benchmark. In an embodiment, the artificial intelligence models in the classifier 402 do not use thresholds to define normal behaviour.

Response Instance

The virtual response instance 426 receives the input of events from the host server. The response instance 426 can perform several tasks with the event data from the processes. For example, the response instance 426 can create a score and a prediction, and then sends the score and prediction about events in the data associated with the processes coming from the multiple endpoint agents back to the server. In an embodiment, the classifier 402 in the scalable cloud platform 135 detects anomalous activity and models the pattern of life for network entities via tasks, for example, formatting, filtering, and then sorting the events in the data associated with processes from the multiple endpoint agents into associations of 1) associated endpoint computing devices and/or 2) associated users with each particular event. The response instance 426 uses machine learning models that model a pattern of life for the network entities saved by the training instance 428 for inference and generation of scores. The response instance 426 is configured to use one or more of the machine learning models that model the pattern of life for the network entities (e.g., network devices and/or users), saved by a training instance, for comparison in the process of the generation of the scores and making inferences. When the classifier 402 gets queried with the event in the data associated with processes from multiple endpoint agents, one of the response instances 426 picks up the query, the response instance 426 then loads the required machine learning models that model the pattern of life for the network entities from, for example, the source observes storage database and produces scores for events in the process data. Accordingly, the response instance 426 is configured to load one or more of the machine learning models that model a pattern of life for the network entities from at least one of 1) a model storage database and 2) a cache in order to analyze the current data associated with the processes operating on that host endpoint computing device 101 and to then at least generate scores for the events in the current data load of the data associated with the processes coming from the one or more endpoint agents. The response instance 426 audits the data associated with processes from multiple endpoint agents and requests for loading the model for the relevant endpoint computing device, the relevant users on that device, and see if this device belongs to any clusters of similar endpoint computing devices that the system has generated. Thus, the response instance 426 loads the required models, such as the model for the one or more network entities associated with the current data load of process data under analysis, from the object storage database, the model storage database, or from a cache, and produces scores for events in the event data. When enough events have been seen, the response instance 426 saves the new events to the events storage database, and messages are put in the queue to instruct the training instances 428 on which models require training. Note, the response instance 426 will also look in the source observer storage database to see if a model corresponding to the endpoint computing device(s) and/or user(s) associated with the event data already exists or an instruction is needed to build a new model for that endpoint computing device(s) and/or user(s) associated with the event data, under analysis. After the scores are generated for the events in the current data load of the data associated with the processes coming from one or more endpoint agents, the response instance 426 is further configured to both save the new events with their scores to an events storage database and put one or more messages in a queue to instruct one or more training instances 428 on which of the one or more machine learning models require training. Note, in an embodiment, the response instance or the training instance can be configured to sort events and submit instructions to a queue. The server then processes the information on the predictions, classifications, and/or scores associated with the analyzed events and sends that information over to the cyber security appliance 120, which can be a physical appliance in the network 110 or a cloud-based cyber security appliance. Thus, the response instance 426 can also send the information regarding the classification and scores for the events in the current data load of the data associated with the processes coming from the one or more endpoint agents over to the cyber security appliance 120 via a server. Therefore, the multiple virtual response instances 426 can classify and generate scores for events in the current data load of the data associated with the processes coming from one or more endpoint agents in the multiple endpoint agents, and subsequently send information regarding the classification and scores for the events in the current data load of the data associated with the processes coming from the one or more endpoint agents to the cyber security appliance 120. The response instance 426 can make inferences/predictions based on the machine learning models that model a pattern of life for the network entities to create the score on, whether something about the event data for the processes from the endpoints being analyzed is good or bad, or unusual. Thus, the response instance 426 can make inferences/predictions based on calculations of unusualness and then the user can subjectively determine the unusualness is good or bad.

In parallel with the server communications, the response instance 426 will also save the above analyzed event data to the events storage database periodically. The response instance 426 re-saves the analyzed events with their scores to the events storage database. The events are organized by source (e.g., sorted by the network device and sorted by the user when it's sorted in the events storage. The response instance 426 sends messages to the queue to trigger training for relevant devices. Again, in an embodiment, the training instance or the response instance may perform the event sorting (and sending messages to queue. The classifier 402 and its response instances 426 and training instances 428 now have a list of those endpoint computing devices and/or users and places the relevant devices in the queue, so that later the training part of this process will know which devices and/or users the training instance 428 needs to build/update models because the system has these new events for the user/device being modeled. Based on the analyzed event data stored into the events storage database periodically, the classifier 402 in the scalable cloud platform 135 is configured to receive a variable amount of load data from endpoint agents and analyze attributes to produce machine learning models of the pattern of life for both events occurring in the process data as well as connection data for these processes and their host endpoint computing devices.

Training Instance

Each training instance 428 can pull instructions from a queue, load relevant machine learning models that model a pattern of life for the network entities from a model storage database, and relevant events that have been analyzed (e.g. scored) by the response instance 426 for a first machine learning model that models a pattern of life for that specific network entity from the event storage database, and then conduct and perform machine learning training as described in the instructions for the loaded machine learning models that model a pattern of life for each of the network entities connected with the relevant events, where after the machine learning training to at least of 1) build and 2) update the loaded machine learning models that model the pattern of life for the network entities connected with the relevant events is complete, then the first training instance 428 saves the trained machine learning models back to the model storage database once finished.

The multiple training instances 428 are configured to build and maintain the machine learning models that model the pattern of life for the network entities. Thus, each machine learning model models a pattern of life for a specific network entity (endpoint computing device 101 and/or user). Thus, each network entity corresponds to at least one of an individual endpoint computing device 101, an individual user, and an individual cluster of similar endpoint computing devices. Thus, a second machine learning model that models a pattern of life for a second network entity corresponds to a different individual endpoint computing device 101 or individual user than the first individual endpoint computing device 101 or individual user. One or more machine learning models are used to learn a pattern of life of a network entity which corresponds to either an individual endpoint device or an individual user. In addition, another entity for which the classifier 402 models a pattern of life is a cluster of similar endpoint computer devices. The multiple training instances 428 are also configured to build and maintain an overall model of behavior for a group of endpoint computing devices that host similar sets of processes. The multiple training instances 428 are configured to build and maintain the machine learning models that model the pattern of life particularized to at least one of an individual network device and individual user for each individual network device and individual user in the network 110. The multiple response instances 426 are configured to detect the anomalous activity (e.g., what is unusual versus what is normal) by a comparison to the particularized machine learning model that models the pattern of life for that an individual network device or individual user as well as to the overall model of behavior for a group of endpoint computing devices that host similar sets of processes.

The training instance 428 has four main tasks.

1) Event Sorting—The training instance 428 periodically checks on the input of unsorted events into the events storage database, which were saved by the response instance. The training instance 428 organizes by the endpoint computing device, then it checks which endpoint computing devices are in these events as well as which users are in these events and may produce training instructions for each endpoint computing device and user present in the newly sorted events. Those instructions are then put on the batch instructions queue shown in FIG. 5.

2) Event Training—The training instance 428 receives from the batch instructions queue an instruction to train on sorted events for a given network entity. The training instance 428 builds "support data" for a model by gathering all the new event data for that user/device from the event storage database and saves it to the model storage database separately from the inference model itself. The training instance 428 updates "support data" and saves the updated "support data" again in the case where old "support data" already exists for a model when Event training is triggered. The training instance 428 grabs the events data including their scores from the events storage. The training instance 428 sends messages to the queue to trigger training for relevant devices. It now has a list of those devices and/or users and places the relevant devices in the queue, so that later on another part of the training will know which devices and/or users the training instance 428 needs to build/update models because the system has these new events for the user/device being modeled.

3) Batch Processing—The training instance 428 uses the support data to create models for a particular endpoint computing device, user and/or cluster of similar endpoint computing devices. Note, the built/updated model for that user and/or device and/or cluster of similar endpoint computing devices is the model that the response instance 426 draws inferences on. Note, in an embodiment, the event data used for training is neither labeled nor filtered. In an embodiment, based on the server formatting the event data can be utilized as labeled training data for the machine learning with the filtered-out particularly relevant events. The training instance 428 uses the support data to create machine learning models that model the pattern of life for that particular network device and/or user and/or cluster of similar endpoint computing devices and then those updated models get saved back into the model storage database. The training instance 428 will train and update each different machine learning model that models the pattern of life over the life of that network entity so that the classifier 402 can make accurate inferences about that network entity.

4) Clustering—The training instance 428 uses a machine learning algorithm to group devices by similar behavior that has been observed. The clustering runs outside the pipeline that the first 3 boxes use and instead occurs periodically. The clustering uses all of the event data for all of the endpoint computing devices (or users) that the system has seen. The clustering can be based on the models that we've built and already saved into the model storage database. Again, the training instance 428 train and update each different overall model of behavior for that particular group of endpoint computing devices that host similar sets of processes over the life of the operation of the network 110 so that the classifier 402 can make accurate inferences.

The classifier 402 will scale an amount of training instances 428 spun up based upon an amount of models needing training and/or building. This can be made possible through the use of many small models, each model associated with its corresponding endpoint computing device 101 and/or user and/or cluster of similar endpoint computing devices instead of a few huge models. Thus, training jobs can be distributed across multiple different training instances 428 running independently but at a same time as another training instance 428 training a model of the pattern of life for a different network entity.

Figure 9:
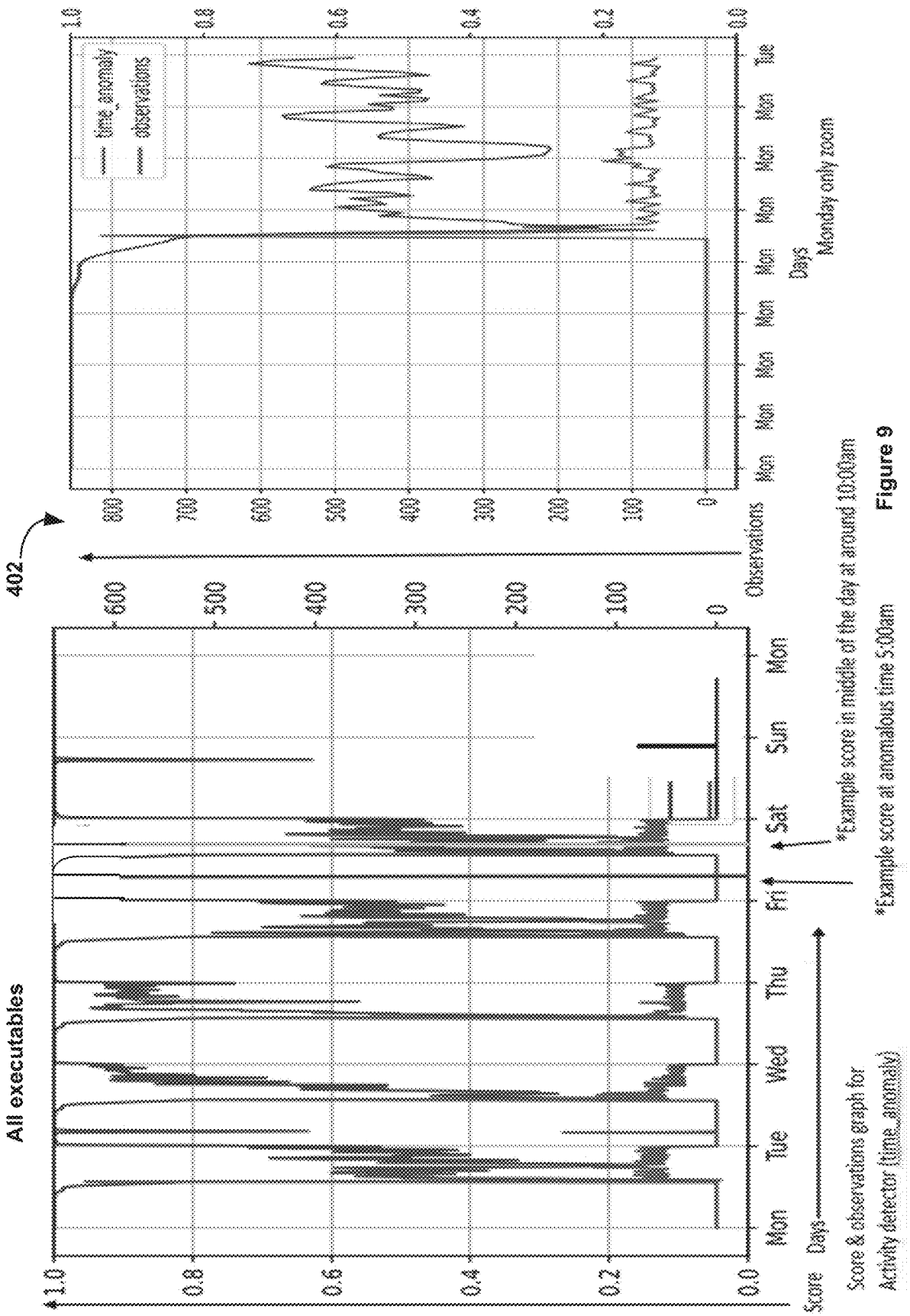
FIG. 9 illustrates an embodiment of an example graph generated by an activity detector of a time anomaly score for observations on different days for i) a given Time Anomaly of any executable running at a particular time on an endpoint device as well as ii) a given Executable Time Anomaly of a specific executable running at a specific time on the endpoint device.

In an embodiment, the classifier 402 and its training instances 428 can train multiple artificial intelligence models discussed herein. FIG. 9 illustrates an embodiment of an example graph generated by an activity detector of a time anomaly score for observations on different days for i) a given Time Anomaly of any executable running at a particular time on an endpoint device as well as ii) a given Executable Time Anomaly of a specific executable running at a specific time on the endpoint device. The Monday only zoom graph on the right is simply the same graph as the other graph in FIG. 9, except zoomed-in to only show time anomaly scores for Monday.

The classifier 402 and its training instances 428 can create and train the following two example AI models utilized in the endpoint device analysis—an activity detector model and a Heatmap detector model.

Activity Detector

The activity detector models, determines, and analyzes 'Time Anomaly' & 'Executable Time Anomaly.' Time Anomaly can be how rare is it for any executable to run at a certain time. Executable Time Anomaly can be how rare is it for a specific executable, such as Zoom, Word, Dropbox, etc., to run at a certain time. The activity detector modelling can require many observations to generate an accurate anomaly score associated with i) a given Time Anomaly of any executable running at a particular time and/or ii) a given Executable Time Anomaly of a specific executable running at a specific time.

The activity detector can record a datetime of observations and then group them into 10-minute bins across the days of the week. Note, the timespan for the bins can change, it is not fixed to 10 minutes, and could be, for example, 60 minutes, etc. Thus, the activity detector can record all of the tracked observations occurring across each of the days of the week and then group them into 10-minute bins for each of the days of the week. The tracked observations can be each executable running on the endpoint device at a certain time over multiple time periods in a day. The tracked observations can also be a specific executable running on the endpoint device at a certain time over multiple time periods in a day. The activity detector can estimate the probability of an event regarding a tracked observation occurring in a given bin. The activity detector can next evaluate the cumulative distribution function (CDF) at each bin of time across the days of the week. The activity detector can determine a probability associated events regarding a tracked observation occurring in a given bin of time across the days of the week. For example, the activity detector can construct a B-spline (e.g., continuous curve) B(t) over the CDF values. The activity detector can determine for an event at time t, the anomaly score is 1–B(t). Thus, the activity detector can graph a time anomaly score for observations on different days for i) a given Time Anomaly of any executable running at a particular time as well as ii) a given Executable Time Anomaly of a specific executable running at a specific time. The graph plots example time anomaly scores at anomalous times versus the days of the week.

Heatmap Detector

Figure 10:
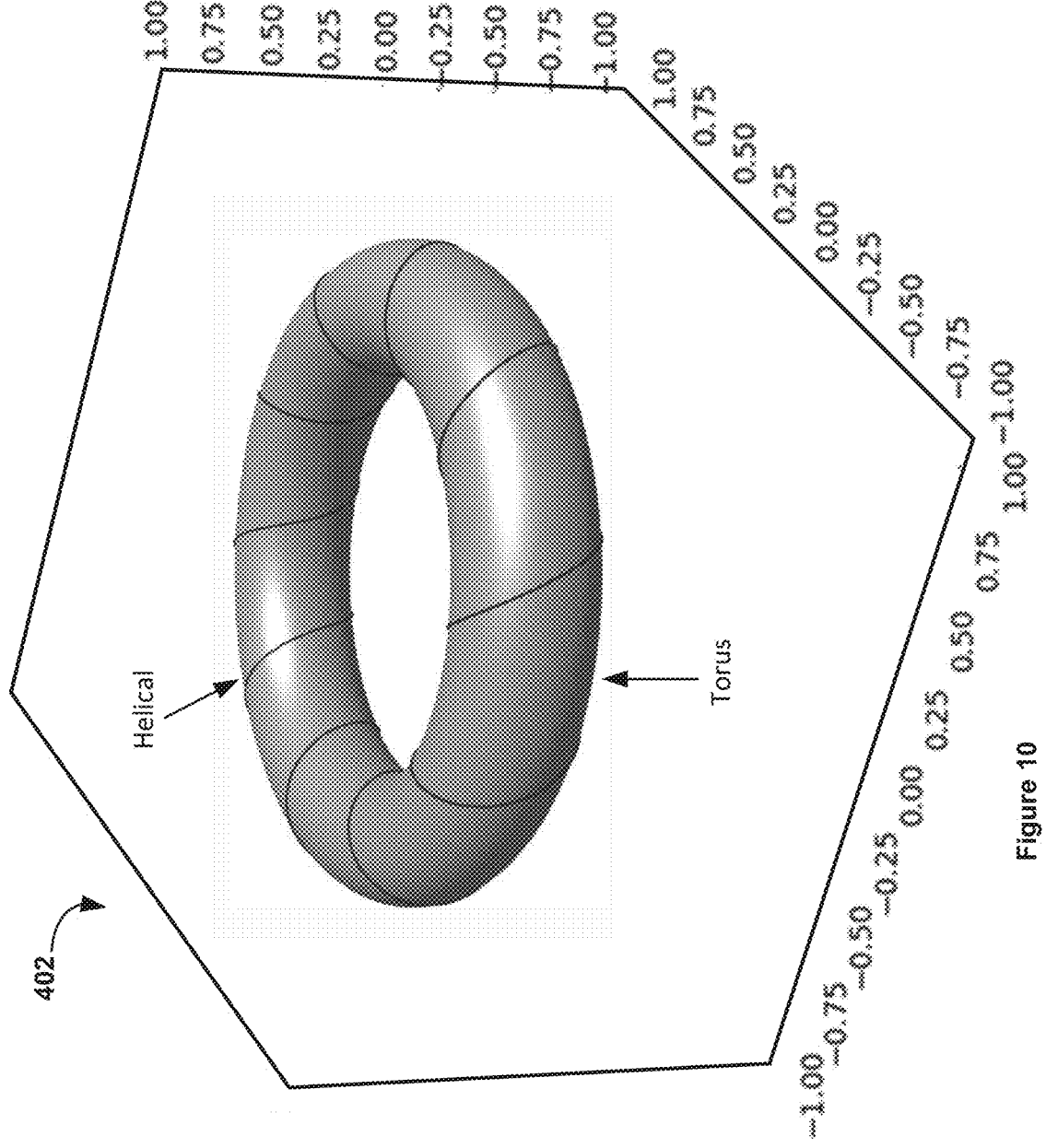
FIG. 10 illustrates an embodiment of a graph of a heatmap detector mapping time to a helix looped around a torus.

The heatmap detector modelling can use less observations to generate an accurate anomaly score associated with i) a given Time Anomaly of any executable running at a particular time and/or ii) a given Executable Time Anomaly of a specific executable running at a specific time. The heatmap detector modelling can require a much lower number of observations, compared to the activity detector, to generate an accurate anomaly score associated with the tracked observations. Overall, the heatmap detector can map time to a helix H(t) looped around a torus T (θ, γ). (See FIG. 10) The heatmap detector can estimate the probability of an event regarding a tracked observation occurring. The heatmap detector can generate a torus (e.g., a surface of a circle in three-dimensional space revolved one full revolution about an axis that is coplanar with the circle) The heatmap detector can then map time to a helix H(t) looped around the torus. The heatmap detector can record observations by dropping probability kernels at the locations on the helix corresponding to the time of the events. The heatmap detector can normalize after the probability kernels are generated from observations. Now each point on the torus approximates the relative likelihood of an event happening in the neighborhood of that point. The heat map detector can determine for an event at time t, the anomaly score is 1–T(H(t)). A subsequent graph plots example Time anomaly scores versus days of the week versus amount of observations.

Additional Points

Note, when the scenario is that there are lots of observations, then the activity detector is the better choice to use as a model for comparison. The heatmap detector produces sensible scores even when the scenario is that there a low amount of tracked observations. The heatmap detector is more accurate when the scenario has small spikes/troughs. The activity detector is more accurate when the scenario goes from zero or a few observations to lots of observations. A controller can be used to determine when to utilize the 1) the heatmap detector, 2) the activity detector, and both the heatmap detector and the activity detector together. In addition, when the controller observes consistently low counts across the executables being run on the endpoint device, then the controller can also cluster observations together.

Figure 5:
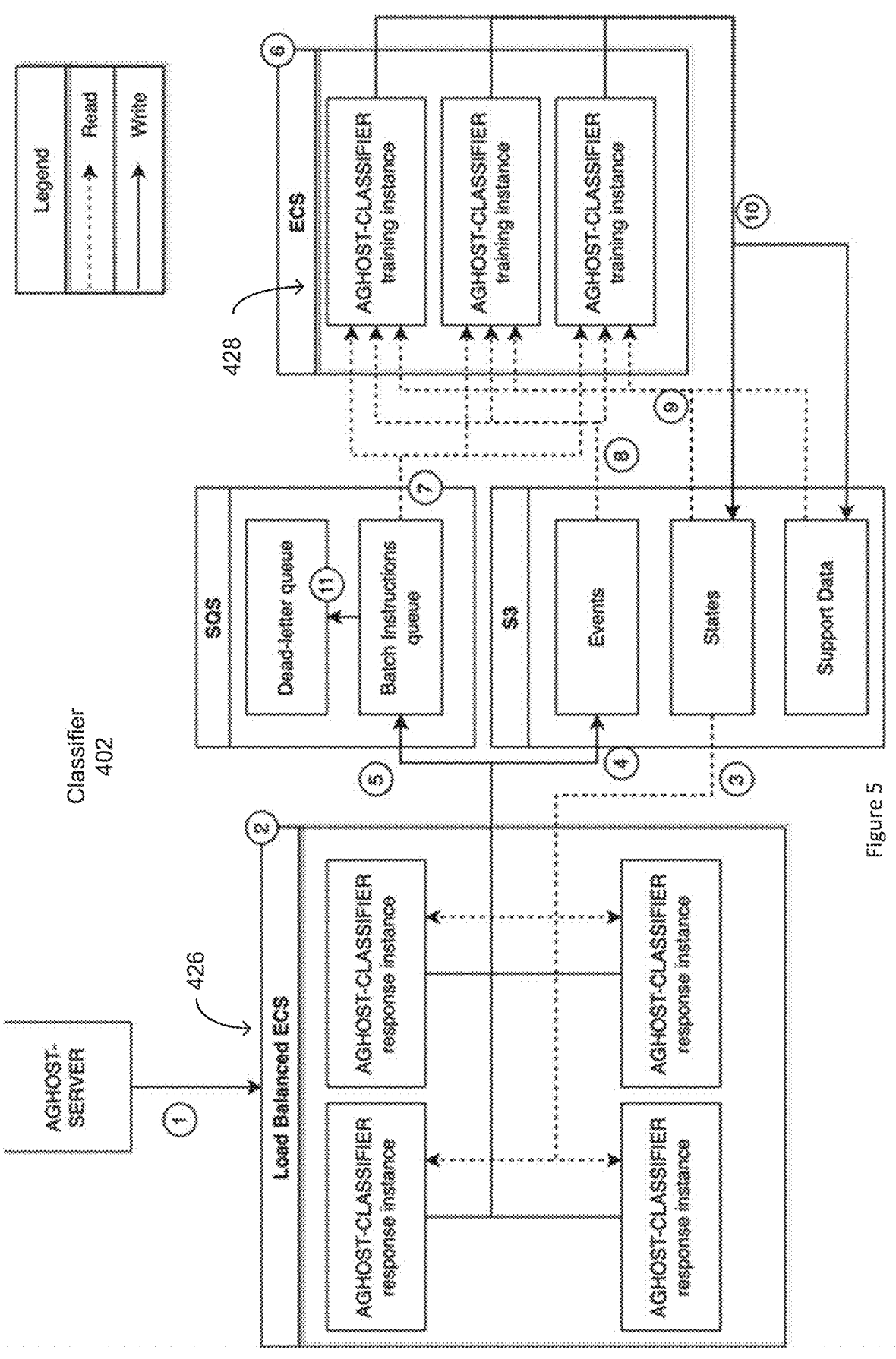
FIG. 5 illustrates a block diagram of an embodiment of an example classifier to spin up the multiple response instances to support the detection of anomalous activity and the multiple training instances to support the modeling of the pattern of life of network entities.

FIG. 5 illustrates a block diagram of an embodiment of the classifier to spin up the multiple response instances to support the detection of anomalous activity and the multiple training instances to support the modeling of the pattern of life of network entities. The classifier 402 is configured to 1) detect anomalous activity and 2) model a pattern of life of network entities through a series of machine learning models cooperating with multiple response and training instances 428 which are served by a scalable cloud platform 135 that receives data associated with processes from multiple endpoint agents. The classifier 402 performs multiple operations as follows. In step 1) the server queries the classifier 402 with events in the current data load of the data associated with the processes coming from one or more endpoint agents, events such as process logging on events as well as process launch events and processes making connections. In step 2) multiple stateless response instances 426 are spun up as, for example, an Elastic Container Service (ECS) task, and requests sent by the server are load balanced using a service discovery. Note, an ECS task consumes resources to run containers based on the configuration in a task definition. Tasks may or may not be long-lived and expose several attributes to help you monitor their state. In an example, ECS service, an Amazon ECS service is configured to run and maintain a specified number of instances of a task definition simultaneously in an Amazon ECS cluster. In another example, an AWS Fargate task can be used. The Amazon ECS runs containers without having to manage servers or clusters of Amazon EC2 instances. With Fargate, the system no longer has to provision, configure, or scale clusters of virtual machines to run containers. In step 3) the response instances 426 load detector states (e.g., model states) from the model storage database, in this example S3, to compute scores for the received events and produce responses. This operation can be costly, and the system attempts to minimize the odds of it happening using an LRU cash. The classifier 402 uses the multiple response instances 426 to return a response containing the scores for the events such as process logging on events as well as process launch events and processes making connections. In step 4) the response instances 426 save event data and scores in the event storage database, such as Simple Storage Service S3, (which the saved event data and scores are needed for training). In step 5) when needed, the response instances 426 submit batch training instructions for specific endpoint computing devices to the queue such as SQS. In step 6) multiple training instances 428 are spun up, for example, as Fargate tasks. In step 7) the training instances 428 consume batch training instructions from the queue. In step 8) the training instances 428 load sorted events from the events storage database (e.g., S3) the particular process events and process launches needed for training the component specified in the batch instruction. In step 9) the training instances 428 load model states from the model storage database (e.g., S3) along with the respective support data that is used for training and then train the models on the event data loaded in the previous step. In step 10) the trained model states are saved back into a database such as S3 along with their support data. In step 11) if an instruction fails to be executed successfully multiple times, it is just moved to the dead letter queue.

The classifier 402 in the scalable cloud platform 135 uses a collection of algorithms, such as clustering, when providing a scalable extension for anomaly detection using data directly collected from processes and other information from host endpoint computing devices in the network 110. The classifier 402 in the scalable cloud platform 135 detects what is unusual, and what is normal compared to that individual host endpoint computing device 101, to that user on that device as well as to similar host endpoint computing devices. The clustering algorithm allows a mechanism to create an overall machine learning model that models a pattern of life for a group of similar host endpoint computing devices. This overall machine learning model that models a pattern of life for a group of similar host endpoint computing devices reduces false positives as well as is able to detect a break from an expected normal pattern of behavior from a given individual host endpoint computing device 101 compared to its similar grouped host endpoint computing devices. The clustering is used to ascertain what is normal, and what is the unusual behavior for that group of similar host endpoint computing devices by using specific algorithms and will generate a data score of what's normal. This algorithm can be used to create the overall machine learning model.

The classifier 402 cooperates with the scalable cloud platform 135 to scale response instances 426 running at any given time as well as training instances 428 running at any given time. A same network 110 protected by the cyber security appliance 120 can have significantly different amounts of data load depending upon a time of day. Most endpoint computing devices are being used for work during the daytime hours compared to endpoint computing devices being used for work during the nighttime. Different networks can have significantly different numbers of endpoint computing devices (e.g., based upon the how many client host endpoint computing devices that a particular network has connected to it), at different loading profiles. Therefore, the classifier 402 cooperating with the scalable cloud platform 135 can scale up and down automatically to meet a current data load that the network 110 might have—more busy devices or less busy devices—at different times of the day. In addition, some networks 110 are globally wide and spread across multiple time zones.

Each endpoint agent 111 can be resident on its own host endpoint computing device.

Clustering

The training instances 428 and response instances 426 of the scalable cloud platform 135 can work with 1) a clustering component as well as 3) a data generator 414 for synthetic data representative of two or more endpoint agents.

The training instances 428 also attempt to identify endpoint computing devices with similar behavioral patterns via distance to resident applications and uses of those endpoint computing devices with similar behavioral patterns. The clustering component in the classifier 402 uses one or more clustering algorithms on the event process data to identify endpoint computing devices with similar behavioral patterns.

Each training instance 428 can be configured to use an example clustering algorithm to create an overall model of behavior for a group of similar endpoint computing devices by applying a Jensen-Shannon divergence to process attributes from the processes resident in the endpoint computing devices in the network 110 and clustering process data from two or more endpoint computing devices deemed to be similar to form the group of similar endpoint computing devices. The process attributes can be representative process attributes as stochastically generated by the models themselves.

The classifier 402 can use a Jensen-Shannon divergence to calculate a notion of a 'distance' of similarity between host endpoint computing devices with resident endpoint agents, which in one use case can be used to create an overall model of behavior for a group of similar host endpoint computing devices feeding data to the scalable cloud platform 135.

The clustering component in the classifier 402 can apply a Jensen-Shannon divergence to endpoint computing devices modeled by their resident processes' attributes. The clustering component in the classifier 402 can use the method of Jensen-Shannon divergence to calculate a notion of a 'distance' between devices that are covered by endpoint agents, so that the classifier 402 may use these distances to run clustering algorithms.

The clustering component in the classifier 402 can treat each endpoint computing device 101 as a distribution over the set of all possible events in the data associated with the processes coming from any of the endpoint agents in the network 110. To compare the distributions of a pair of endpoint computing devices D1 and D2, the system uses various detectors (AI based classifiers 402, machine learning models, etc.) to synthetically generate/predict a batch of events that represent an 'average' or 'representative sample' for the events in the data associated with the processes coming from each of the endpoint agents in the network 110. The clustering component can apply the 'representative sample' for the events observed on each particular endpoint computing device 101—called in this example e1 and e2.

The idea behind these is that they are a good subset of 'the set of all events' to effectively differentiate the distributions of the two endpoint computing devices.

The clustering component in the classifier 402 can use the models to work out the probability of observing a given event on a device.

The clustering component can Calculate the distance using:

$$\frac{\sum_{e \in e_1}\left(\log 2 - \log\left(1 + \frac{P_2(e)}{P_1(e)}\right)\right) + \sum_{e \in e_2}\left(\log 2 - \log\left(1 + \frac{P_1(e)}{P_2(e)}\right)\right)}{\log 2 * (|e_1| + |e_2|)}$$

Where P1(e) is the probability of observing e on device 1 and P2(e) is the probability of observing e on device 2.

This result is 0 between 1. This result is 0 if the endpoint computing devices have the exact same distribution events in the data associated with the processes coming from each of the endpoint agents and is 1 if any event that has a probability of being observed on one device has a zero probability of being observed on the other endpoint computing device. The clustering component can use this notion of distance between devices to sort them into clusters of endpoint computing devices. The system can also substitute probabilities for the survival function (=1−p-value), and similar properties i.e., monotonic, errors will cancel when considering in the above formula.

Hierarchy of Clustering Algorithms

The clustering component in the classifier 402 can apply the Partitioning Around Medoids (PAM) algorithm to generate clusters on an endpoint deployment. The clustering component in the classifier 402 can use two methods to work out the 'distance' between a pair of devices—Jensen-Shannon and Jaccard. The latter is fairly simple and just works out the intersection of unique processes divided by the union over the two endpoint computing devices.

The clustering component in the classifier 402 can use both methods of clustering simultaneously.

The clustering component in the classifier 402 can perform Jaccard more often because Jaccard is computationally cheaper. For a given event on an endpoint computing device, an anomaly score can be calculated for both its Jaccard cluster and its Jensen-Shannon cluster (if available). The Jensen-Shannon is given more weight when it is available.

Also, different detector types (e.g., AI models) may work better with one cluster type over the other. In those cases, the clustering component can perform score calculations using the cluster type that best suits it.

This method can cluster endpoint computing devices based upon similar attributes of the processes that are running on their devices, a number of different metrics about behavior, and the kind of protocols.

Data Generator

A data generator 414 can be configured to cooperate with the classifier 402 in the scalable cloud platform 135. A data generator 414 to generate synthetic data, derived from data sensed and collected by a set of endpoint agent 111 residents, can be used to do different functions. For example, the generated synthetic data can create a test load of data and see how the system, such as the classifier 402 and the scalable cloud platform 135, deals with the volume of that load of synthetic data as well as test and accuracy/validity of the machine learning in the system by sending in known test loads of synthetic data and then evaluating the resulting machine learning and scores generated compared to the known characters in the known test load of synthetic data. The data generator 414 can provide the synthetic data (e.g., a mimicked set of events in the data associated with the processes coming from one or more simulated cSensors/ endpoint agents resident on their own simulated host endpoint computing device). The data generator 414 can provide the synthetic data to 1) data load-test for proposed new features added into a first endpoint agent 111 to test out a data loading effect on the scalable cloud platform 135 prior to releasing the proposed new features 'in masse' from all of the multiple endpoint agents in a field as well as 2) provide a validation check on the classifications and scores produced by the response instances 426 by sending in the synthetic data that has known classifications and scores. Thus, the data generator 414 can be used for load-testing and prototyping new features at a limited scale and event grouping to see the effect and then be able to estimate from there and/or in a test server environment at full scale. The data generator 414 can be used for recombination to generate increased quantities of high-quality synthetic data. The data generator 414 provides a way of supplying synthetic data but realistic data to test whether or not the cloud scalable infrastructure/architecture servicing the host endpoint computing devices will work for varying amounts of data load. Thus, the data generator 414 generates synthetic data to ensure that the scalable cloud platform 135 is able to deal with significant increases in an amount of data load demand prior to actually subjecting the scalable cloud platform 135 directly to the real increased data load. The data generator 414 provides a way of supplying synthetic data but realistic data that has the potential of mixing in of known malicious data contained within the current data load being processed by the classifier 402. Thus, the data generator 414 allows testing those response instances, one or more machine learning models, and training instances 428 to see which ones that do produce the expected outcome and ones that do not. This should reduce false positives in the anomaly detection by fine-tuning the detection thresholds that are set. In an embodiment, the classifier 402 does not use thresholds. Instead, the classifier 402 tries to find the most anomalous events in the noise. The data generator 414 should help in fine-tuning of the models and the scores themselves so that the mixed in malicious data has a significantly different score from the benign data which would allow a threshold to be set to separate those two categories.

Synthetic Data

The synthetic data at least partially derived from the actual data load of that particular network 110 and can be looped in a repeating pattern to create a greater amount of synthetic data, which can be modulated both in rate and in varying the data within a recorded data stream. The data generator 414 also constructs and ties in a chain of related events together from the recorded data in order to create quality test data that will generate more accurate analysis by machine learning and then groups those events together both by the events, overlapping and similar chains of events being observed, as well as then, approximately at the same time more processes more events are occurred and launched from that process that has been launched. The data generator 414 sends the connection and process data like real endpoint agents, either stochastically generated or by replaying actual recorded data. However, as discussed, additional data can be spliced into the actual recorded data. In an embodiment, the data generator 414 either uses smart recombination or simple replaying of generated synthetic data. The data generator does not use machine learning for generating events. In an embodiment, the data generator 414 can generate random data based on machine learning observing normal patterns (such as network traffic patterns, events data coming from processes resident in endpoint computing devices, etc.) in a network 110 and then having machine learning generate synthetic data that looks like modeled normal data.

The data generator 414 to generate synthetic data is configured to make sure that the quality and variety of the data are not limited: i) so that replayed data is varied enough, e.g. the system taps into the records of many, many endpoint agents, as well as ii) the fully stochastic/synthetic data is representative of realistic data by humans or artificial intelligence calibrating the high-quality synthetic data from the simulated endpoint agents to very carefully correspond to real data from the network 110 under analysis. For example, the data generator 414 to generate synthetic data can achieve the best of both methods by recombining and re-ordering the real, raw recorded events stochastically. However, doing this naively could be incoherent sometimes because the events are tied to each other. For instance, on start-up many events are generated, and sending these out of order is nonsensical. Instead, the data generator 414 to generate synthetic data tries to recombine "actions" which occurred on a recorded machine, such as "open word.exe", "open chrome", and "visit google.com", etc., which are independent. An example method is to group the raw events into actions by using relative event times. For instance, during the start-up procedure of a computer, many processes are started in quick succession, so the system can group these together as one action. In contrast to this, if the system has the process "explorer.exe", and then sometime later the system sees it launch a child process "word.exe", the system reasons that it must have been some external input that launched the application and so it is not part of the "start-up" action, but its own action.

The data generator 414 to generate synthetic data inserts randomness into the replayed data in order to vary the data being seen by the machine learning components enough to obtain different analyses as well as can insert known good data OR known data indicative of a cyber-attack and then check the machine learning analysis of the replayed data with the inserted data to cause a variation in the data being replayed.

Use Cases

As discussed, the data generator 414 can be used in sandbox environments of a simulated, or virtual environment. The data generator 414 can substitute for one or more simulated endpoint agents (e.g., cSensor) on simulated host devices for load-testing and prototyping new features at scale, event grouping, and recombination to generate increased quantities of high-quality synthetic data.

The data generator 414 to generate synthetic data, which can be used to test a backend test server system prior to releasing the planned changes in the actual endpoint agents. The data generator 414 to generate synthetic data allows the system to have large-scale experiments without disrupting the ongoing security monitoring of real computers. For instance, when a user of the system wants to add a feature to an endpoint agent 111 (e.g. cSensor), which will cause the data throughput of individual devices to increase, then through cooperation with the simulated and/or virtual environment, the user and system will be able to determine if the backend servers will be able to handle this increased traffic without excessive lag even if there are many devices (e.g. 2000 plus computing devices each feed this increased traffic). The data generator 414 to generate synthetic data allows the system to not perform this testing with a real-world physical network 110 and computing devices, which could jeopardize losing the visibility of the entire company network 110. Instead, the system uses the data generator 414 to run the experiment with large quantities of high-quality synthetic data from the data generator 414 on a separate, dedicated backend system. Alternatively, and/or additionally, the data generator 414 to generate synthetic data can be used on real world systems, such as the classifier 402 and the scalable cloud platform 135 in the real world to conduct tests.

An important part of the data generator 414 to generate synthetic data and backend test environment is that proposed software changes and interactions in actually deployed endpoint agents in an actual network 110 can be made to the synthetic data and run through internal testing without exposing an actual customer network 110. This way prior to the proposed changes and updates, the system has a reasonable estimation of the extent and effect the proposed changes and updates will have when deployed on actual endpoint agents and the cyber security appliance 120 in an actual network 110.

Also, the data generator 414 to generate synthetic data cooperating with a backend testing system can be tested on networks 110 of varying sizes of host computing devices to see the effect. For example, the data generator 414 can generate a volume of synthetic data representing two hundred (200) computing devices each hosting an endpoint agent, 5000 computing devices each hosting an endpoint agent, etc., and feed the data load to the cyber security appliance 120 directly and/or to a classifier 402 with a scalable cloud platform 135.

The classifier and its response instances and training instances on the scalable cloud platform will consume CPU cycles and process with greater efficiency than the total CPU cycles consumed if each endpoint computing device needed to analyze and evaluate the process data with machine learning models operating on each endpoint computing device. Users could have a negative experience if the system uses too much CPU on their company issued laptops and reduce the efficiency of the user by slowing down the endpoint device machines. Sensitive information can be more exposed if it was deployed in a more accessible place like an endpoint device (vs a backend system). For clustering, the system can use data from multiple devices at once (to determine the clusters and then build models for the cluster). The centralized solution is much simpler than trying to share the data between the devices.

Figure 6:
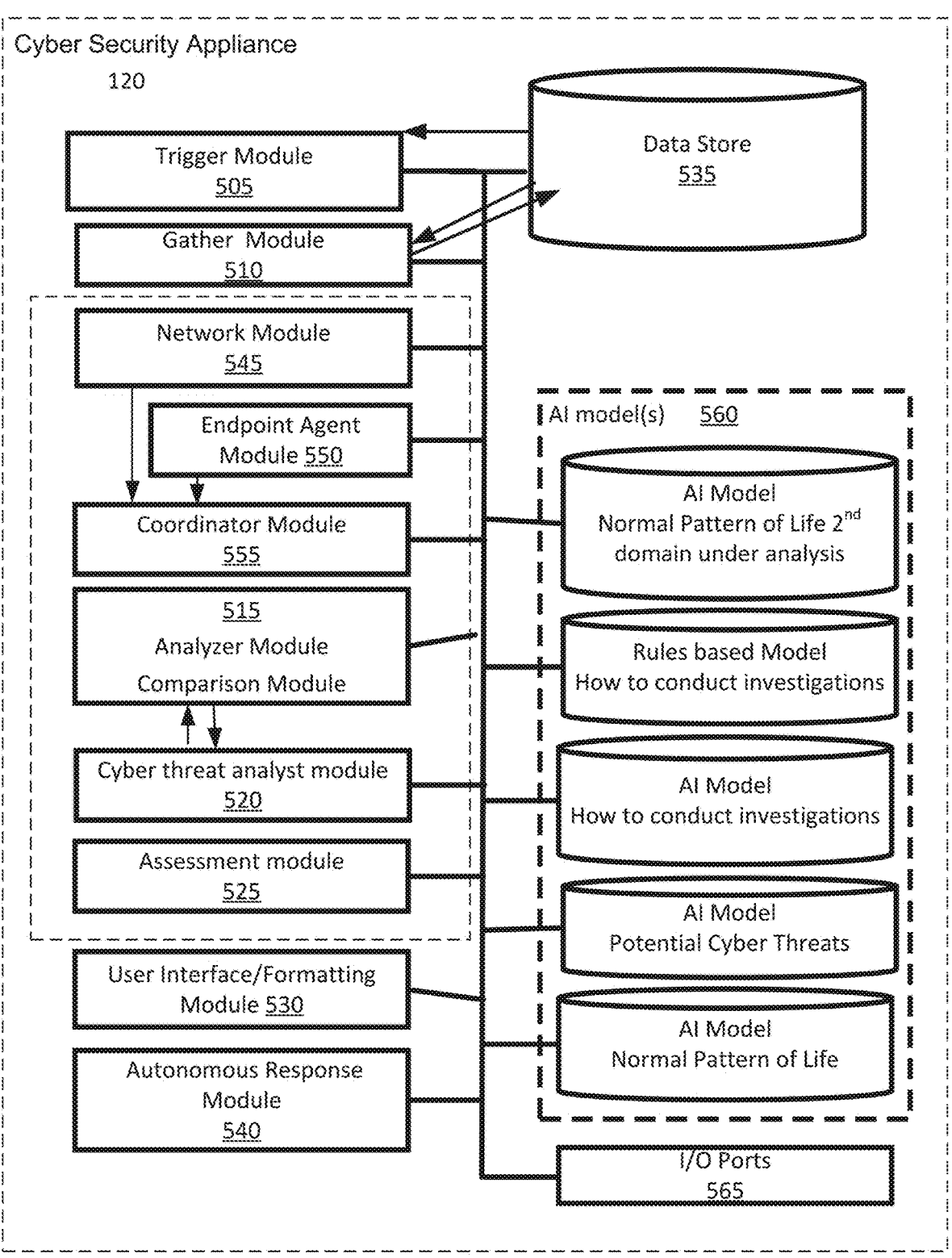
FIG. 6 illustrates a block diagram of an embodiment of an example AI based cyber security appliance that protects a system, including but not limited to a network/domain, from cyber threats.

FIG. 6 illustrates a block diagram of an embodiment of the AI based cyber security appliance 120 that protects a system, including but not limited to a network/domain, from cyber threats. Various Artificial Intelligence models and modules of the cyber security appliance 120 cooperate to protect one or more networks/domains under analysis from cyber threats. As shown, according to one embodiment of the disclosure, the AI-based cyber security appliance 120 may include a trigger module 505, a gather module 510, an analyzer module 515, a cyber threat analyst module 522, an assessment module 525, a formatting module 530, a data store 535, an autonomous response module 540, a first $(1^{st})$ network module 545, a second $(2^{nd})$ endpoint agent module 550, and a coordinator module 555, a datastore, one or more AI models 560 (hereinafter, AI model(s)"), and/or other modules. The AI model(s) 560 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms.

The cyber security appliance 120 securely communicates and cooperates with a suite of different endpoint agents 111 that can ingest onboard traffic from multiple different independent systems using protocols for at least one of a data link layer, a physical layer, and then one or more of an application layer, a transport layer, a network layer, and any combination of these layers when a protocol is used in that layer in the independent system. The centralized cyber security appliance 120 can securely communicate and cooperate with a suite of two or more different endpoint agents 111 that has a suite of modules to capture network data as well as process data running on endpoint devices. The centralized cyber security appliance 120 can securely communicate and cooperate with a classifier 402 and a scalable cloud platform 135.

The cyber security appliance 120 with the Artificial Intelligence (AI) based cyber security system may protect a network/domain from a cyber threat. In an embodiment, the cyber security appliance 120 can protect all of the devices (e.g., computing devices on the network(s)/domain(s) being monitored by monitoring domain activity including communications). For example, a network domain module 545 may communicate with network sensors to monitor network traffic going to and from the computing devices on the network as well as receive secure communications from software agents embedded in host computing devices/containers. The steps below will detail the activities and functions of several of the components in the cyber security appliance 120.

The gather module 510 may be configured with one or more process identifier classifiers. Each process identifier classifier may be configured to identify and track one or more processes and/or devices in the network, under analysis, making communication connections. The data store 535 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 535. In addition, a feature classifier can examine and determine features in the data being analyzed into different categories.

The analyzer module 515 can cooperate with the AI model(s) 560 or other modules in the cyber security appliance 120 to confirm a presence of a cyberattack against one or more domains in an enterprise's system. A process identifier in the analyzer module 515 can cooperate with the gather module 510 to collect any additional data and metrics to support a possible cyber threat hypothesis. Similarly, the cyber threat analyst module 522 can cooperate with the internal data sources as well as external data sources to collect data in its investigation. More specifically, the cyber threat analyst module 522 can cooperate with the other modules and the AI model(s) 560 in the cyber security appliance 120 to conduct a long-term investigation and/or a more in-depth investigation of potential and emerging cyber threats directed to one or more domains in an enterprise's system. Herein, the cyber threat analyst module 522 and/or the analyzer module 515 can also monitor for other anomalies, such as model breaches, including, for example, deviations for a normal behavior of an entity, and other techniques discussed herein. As an illustrative example, the analyzer module 515 and/or the cyber threat analyst module 522 can cooperate with the AI model(s) 560 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 522 allows two levels of investigations of a cyber threat that may suggest a potential impending cyberattack. In a first level of investigation, the analyzer module 515 and AI model(s) 560 can rapidly detect and then the autonomous response module 540 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 522 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 522 also conducts a second level of investigation over time with the assistance of the AI model(s) 560 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and can in various cases use AI classifiers as part of their operation. The cyber threat analyst module 522 forms in conjunction with the AI model(s) 560 trained with machine learning on how to form cyber threat hypotheses and how to conduct investigations for a cyber threat hypothesis investigate hypotheses on what are a possible set of cyber threats. The cyber threat analyst module 522 can also cooperate with the analyzer module 515 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 560 trained with machine learning on the normal pattern of life of entities in the system. For example, the cyber threat analyst module 522 may perform several additional rounds of gathering additional information, including abnormal behavior, over a period of time, in this example, examining data over a 7-day period to determine causal links between the information. The cyber threat analyst module 522 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 6, an input from the cyber threat analyst module 522 of a supported hypothesis of a potential cyber threat will trigger the analyzer module 515 to compare, confirm, and send a signal to act upon and mitigate that cyber threat. In contrast, the cyber threat analyst module 522 investigates subtle indicators and/or initially seemingly isolated unusual or suspicious activity such as a worker is logging in after their normal working hours or a simple system misconfiguration has occurred. Most of the investigations conducted by the cyber threat analyst module 522 cooperating with the AI model(s) 560 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 522 will occur before the algorithms in the cyber threat analyst module 522 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 7 and a chain of linked low-level indicators, including abnormal behavior compared to the normal pattern of life for that entity, all under a score of 50 on a threat indicator score). The investigations by the cyber threat analyst module 522 can happen over a relatively long period of time and be far more in depth than the analyzer module 515 which will work with the other modules and AI model(s) 560 to confirm that a cyber threat has in fact been detected.

The gather module 510 may further extract data from the data store 535 at the request of the cyber threat analyst module 522 and/or analyzer module 515 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 510 cooperates with the cyber threat analyst module 522 and/or analyzer module 515 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 522 is configured to cooperate with the AI model(s) 560 trained with machine learning on how to form cyber threat hypotheses and how to conduct investigations for a cyber threat hypothesis to form and investigate hypotheses on what are a possible set of cyber threats and then can cooperate with the analyzer module 515 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 560 trained with machine learning on the normal pattern of life/normal behavior of entities in the domains under analysis.

Note, in the first level of threat detection, the gather module 510 and the analyzer module 515 cooperate to supply any data and/or metrics requested by the analyzer module 515 cooperating with the AI model(s) 560 trained on possible cyber threats to support or rebut each possible type of cyber threat. Again, the analyzer module 515 can cooperate with the AI model(s) 560 and/or other modules to rapidly detect and then cooperate with the autonomous response module 540 to autonomously respond to overt and obvious cyberattacks, (including ones found to be supported by the cyber threat analyst module 522).

As a starting point, the AI-based cyber security appliance 120 can use multiple modules, each capable of identifying abnormal behavior and/or suspicious activity against the AI model(s) 560 of normal behavior for the entities in the network/domain under analysis, which is supplied to the analyzer module 515 and/or the cyber threat analyst module 522. The analyzer module 515 and/or the cyber threat analyst module 522 may also receive other inputs such as AI model breaches, AI classifier breaches, etc. a trigger to start an investigation from an external source.

Many other model breaches of the AI model(s) 560 trained with machine learning on the normal behavior of the system can send an input into the cyber threat analyst module 522 and/or the trigger module 505 to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 522 cooperating with the AI model(s) 560 trained with machine learning on how to form cyber threat hypotheses and how to conduct investigations for a cyber threat hypothesis in the AI-based cyber security appliance 120 provides an advantage as it reduces the time taken for human led or cyber security investigations, provides an alternative to manpower for small organizations and improves detection (and remediation) capabilities within the cyber security appliance 120.

The cyber threat analyst module 522, which forms and investigates hypotheses on what are the possible set of cyber threats, can use hypotheses mechanisms including any of 1) one or more of the AI model(s) 560 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 560 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 522 and/or the analyzer module 515 can feed the cyber threat details to the assessment module 525 to generate a threat risk score that indicate a level of severity of the cyber threat.

According to one embodiment of the disclosure, the assessment module 525 can cooperate with the AI model(s) 560 trained on possible cyber threats to use AI algorithms to identify actual cyber threats and generate threat risk scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 120.

Training of AI Pre Deployment and then During Deployment

In step 1, an initial training of the AI model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence predeployment can all be trained on the specific machine learning task that they will perform when put into deployment. For example, the AI model, such as AI model(s) 560 or example (hereinafter "AI model(s) 560"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats.

In this example, one of the AI models 560 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 120, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 560 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

A deployed AI model trained on a normal pattern of life of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more of the AI models 560 of FIG. 6 trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of the AI model(s) 560 of FIG. 6 trained on a normal pattern of life of entities in the system can occur. Initial training of the AI model(s) 560 trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis.

During deployment, what is considered normal behavior will change as each different entity's behavior changes and will be reflected through the use of unsupervised learning in the model such as various Bayesian techniques, clustering, etc. The AI models 560 can be implemented with various mechanisms such neural networks, decision trees, etc. and combinations of these. Likewise, one or more supervised machine learning AI models 560 may be trained to create possible hypotheses and perform cyber threat investigations on agnostic examples of past historical incidents of detecting a multitude of possible types of cyber threat hypotheses previously analyzed by human cyber security analyst. More on the training of AI models 560 are trained to create one or more possible hypotheses and perform cyber threat investigations will be discussed later.

At its core, the self-learning AI models 560 that model the normal behavior (e.g. a normal pattern of life) of entities in the network mathematically characterizes what constitutes 'normal' behavior, based on the analysis of a large number of different measures of a device's network behavior—packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 560) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber security analyst. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Next, the various AI models and AI classifiers combine use of unsupervised and supervised machine learning to learn 'on the job'—it does not depend upon solely knowledge of previous cyberattacks. The AI models and classifiers combine use of unsupervised and supervised machine learning constantly revises assumptions about behavior, using probabilistic mathematics, which is always up to date on what a current normal behavior is, and not solely reliant on human input. The AI models and classifiers combine use of unsupervised and supervised machine learning on cyber security is capable of seeing hitherto undiscovered cyber events, from a variety of threat sources, which would otherwise have gone unnoticed.

Next, these cyber threats can include, for example, Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.
Ranking the Cyber Threat The assessment module 525 and/or cyber threat analyst module 522 of FIG. 6 can cooperate with the AI model(s) 560 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts or notifications to the enterprise security administrator in a rigorous manner and prioritize those which most urgently require action. Meanwhile, it also assists to avoid the problem of numerous false positives associated with simply a rule-based approach.

As discussed in more detail above, the analyzer module 515 and/or cyber threat analyst module 522 can cooperate with the one or more unsupervised AI (machine learning) model 560 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 120, the emerging cyber threat can be previously unknown, but the emerging threat landscape data 170 representative of the emerging cyber threat shares enough (or does not share enough) in common with the traits from the AI models 560 trained on cyber threats to now be identified as malicious or benign. Note, if later confirmed as malicious, then the AI models 560 trained with machine learning on possible cyber threats can update their training. Likewise, as the cyber security appliance 120 continues to operate, then the one or more AI models trained on a normal pattern of life for each of the entities in the system can be updated and trained with unsupervised machine learning algorithms. The analyzer module 515 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

The AI model(s) 560 can continually learn and train with unsupervised machine learning algorithms on an ongoing basis when deployed in their system that the cyber security appliance 120 is protecting. Thus, learning and training on what is normal behavior for each user, each device, and the system overall and lowering a threshold of what is an anomaly.
Anomaly Detection/Deviations Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyberattack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day-to-day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two-level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 120 should not flag a data point as an anomaly based on a single feature. Merely, when a combination of all the probability values for all features for a given data point is calculated can the modules cooperating with the AI model of normal behavior can say with high confidence whether a data point is an anomaly or not.

Again, the AI models trained on a normal pattern of life of entities in a system (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, during pre-deployment the cyber threat analyst module 522 and the analyzer module 515 can use data analysis processes and cooperate with AI model(s) 560 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 515 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 560 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both endpoint agent and IT network domains under analysis. Thus, endpoint agent and IT network raw sources of data can be examined along with a large number of derived metrics that each produce time series data for the given metric.

A domain module is constructed and coded to interact with and understand a specific domain.

For instance, the first network module 545 may operate as an IT network module configured to receive information from and send information to, in this example, IT network-based sensors (i.e., probes, taps, etc.). The first network module 545 also has algorithms and components configured to understand, in this example, IT network parameters, IT network protocols, IT network activity, and other IT network characteristics of the network under analysis. The endpoint agent module 550 receives information and analyzes information from a second domain of individual processes operating on each endpoint device. The endpoint agent module 550 is configured to receive information from and send information to, in this example, from endpoint agents. The endpoint agent module 550 also has algorithms and components configured to understand, in this example, process parameters and activity, and other characteristics of individual processes of broadly a computer program (e.g., Word, Excel, web browser, SaaS application, etc.) that is being executed, at least in part, on the endpoint computing devices under analysis. Additional domain modules can also collect domain data from another respective domain.

The coordinator module 555 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The network and endpoint agent domain modules 545, 550 can cooperate to exchange and store their information with the data store.

The process identifier classifier (not shown) in the gather module 510 can cooperate with additional classifiers in each of the network module 545 and the endpoint agent module 550 to assist in tracking individual processes and associating them with entities in their respective domains under analysis as well as individual processes and how they relate to each other. The process identifier classifier can cooperate with other trained AI classifiers in the modules to supply useful metadata along with helping to make logical nexuses.

A feedback loop of cooperation exists between the gather module 510, the analyser module 515, AI model(s) 560 trained on different aspects of this process, and the cyber threat analyst module 522 to gather information to determine whether a cyber threat is potentially attacking the networks/ domains under analysis.

The analyzer module 515 and/or cyber threat analyst module 522 can use multiple factors to the determination of whether a process, event, object, entity, etc. is likely malicious.

Figure 7:
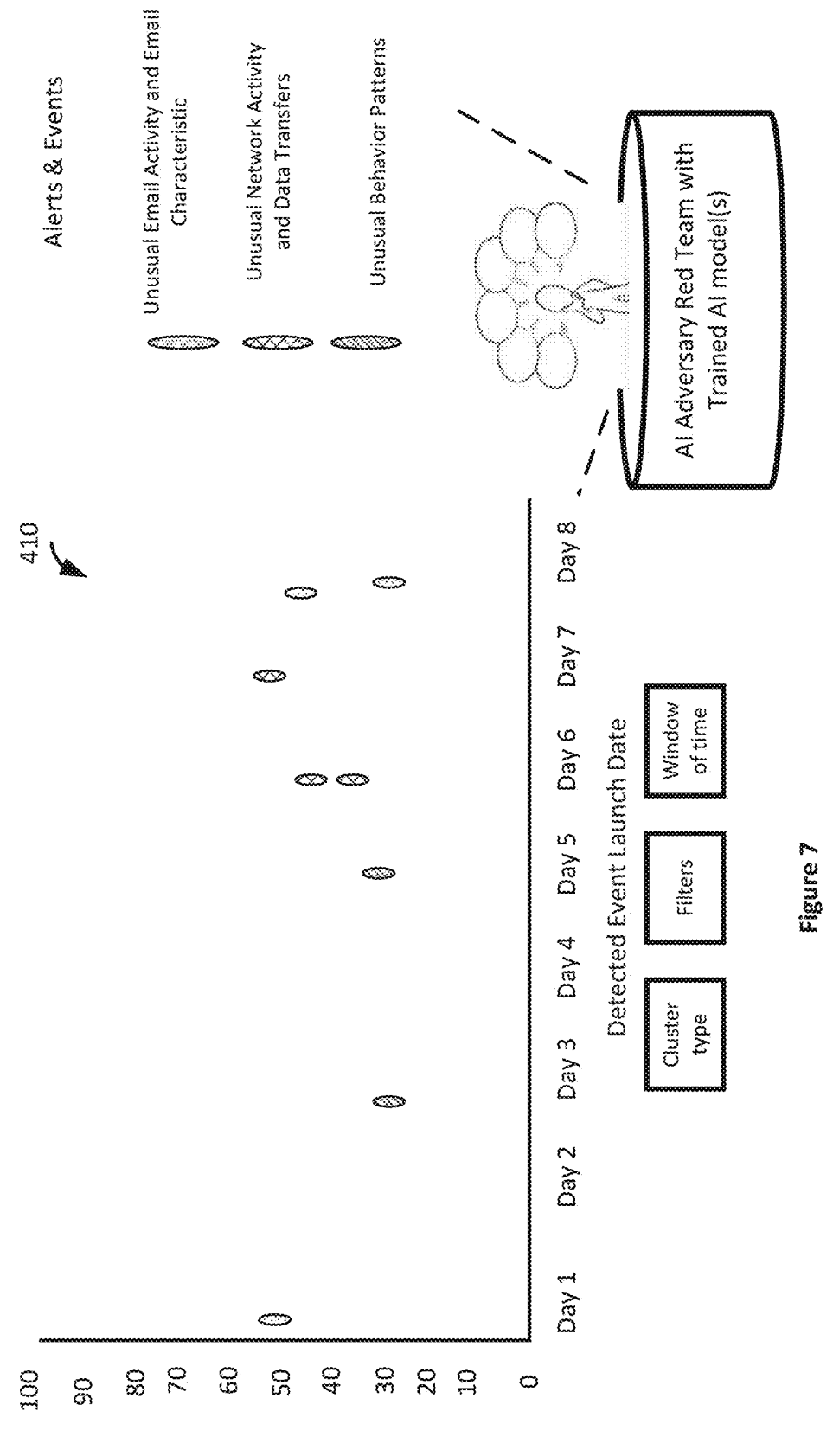
FIG. 7 illustrates a graph of an embodiment of an example chain of unusual behavior for, in this example, the endpoint agent activities as well as IT activities deviating from a normal pattern of life for this user and/or device in connection with the rest of the network under analysis.

FIG. 7 illustrates a graph of an embodiment of an example chain of unusual behavior for, in this example, the endpoint agent activities as well as IT activities deviating from a normal pattern of life for this user and/or device in connection with the rest of the network under analysis. In an example, a behavioural pattern analysis for identifying what are the unusual behaviours of the network/system/device/ user under analysis by the AI (machine learning) models may be as follows. The coordinator module 555 can tie the alerts, activities, and events from, in this example, the endpoint domain to the alerts, activities, and events from the IT network domain. As shown in FIG. 7, a graph 410 of an embodiment of an example chain of unusual behaviour for, in this example, the endpoint activities as well as IT activities deviating from a normal pattern of life for this user and/or device in connection with the rest of the system/ network under analysis. The cyber threat analysist module 522 and/or analyzer module 515 can cooperate with one or more AI (machine learning) models. The one or more AI (machine learning) models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor—human, program, or other threat. The cyber threat analyst module 522 can go back and pull in some of the normal activities to help support or refute a possible hypothesis of whether that pattern is indicative of a behavior of a malicious actor.

An illustrative example of a behavioral pattern included in the chain is shown in the graph over a time frame of, an example, 7 days. The cyber threat analyst module 522 detects a chain of anomalous behavior of unusual data transfers three times, unusual characteristics in a launch of process running on an endpoint device in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three process launches with unusual characteristics. Again, the cyber security appliance 120 can go back and pull in some of the normal activities to help support or refute a possible hypothesis of whether that pattern is indicative of a behaviour of a malicious actor. The analyser module 515 of FIG. 6 can cooperate with one or more models trained on cyber threats and their behaviour to try to determine if a potential cyber threat is causing these unusual behaviours. The cyber threat analyst module 522 can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 120 is configurable in a user interface, by a user, enabling what type of automatic response actions, if any, the cyber security appliance 120 may take when different types of cyber threats, indicated by the pattern of behaviours under analysis, that are equal to or above a configurable level of threat posed by this malicious actor.

Referring still to FIG. 6, the autonomous response module 540 is configured to take one or more autonomous mitigation actions to mitigate the cyber threat during the cyberattack by the cyber threat. The autonomous response module 540 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, endpoint device threats to identify similar characteristics from the individual alerts and/or events forming the distinct item made up of the chain of alerts and/or events forming the unusual pattern.

The autonomous response module 540 can be an autonomous self-learning digital response coordinator that is trained specifically to control and reconfigure the actions of traditional legacy computer defenses (e.g., firewalls, switches, proxy servers, etc.) to contain threats propagated by, or enabled by, networks and the internet. The cyber threat analyst module 522 and/or assessment module 525 can cooperate with the autonomous response module 540 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention. The trigger module 505, analyzer module 515, assessment module 525, the cyber threat analyst module 522, and formatting module 530 cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

In this exemplary embodiment of the cyber security appliance 120, a first computing device 1 on the first computer system 10 has the electronic hardware, modules, models, and various software processes of the cyber security appliance 120; and therefore, runs threat detection for detecting threats to the first computer system 10. As such, the first computing device 1 includes one or more processors arranged to run the steps of the process described herein, memory storage components required to store information related to the running of the process, as well as one or more network interfaces for collecting information from various security controls (e.g., sensors, probes, etc.) collecting data associated with the system (network) 50 under analysis.

The cyber security appliance 120 in the first computing device 1 builds and maintains a dynamic, ever-changing model of the 'normal behavior' of each user and machine within the first computer system 10. The approach is based on Bayesian mathematics, and monitors all interactions, events, and communications within the first computer system 10—which computing device is talking to which, files that have been created, networks that are being accessed. For example, a second computing device 2 is based in a company's San Francisco office and operated by a marketing employee who regularly accesses the marketing network, usually communicates with machines in the company's U.K. office in the second computer system 40 between 9.30 AM and midday and is active from about 8:30 AM until 6 PM. The same employee virtually never accesses the employee time sheets, very rarely connects to the company's Atlanta network and has no dealings in South-East Asia. The cyber security appliance 120 takes all the information that is available relating to this employee and establishes a 'pattern of life' for that person and the devices used by that person in that system, which is dynamically updated as more information is gathered. The model of the normal pattern of life for an entity in the system 50 under analysis is used as a moving benchmark, allowing the cyber security appliance 120 to spot behavior on the system 50 seems to fall outside of this normal pattern of life, and flags this behavior as anomalous, requiring further investigation and/or autonomous action.

The cyber security appliance 120 is built to deal with the fact that today's attackers are getting stealthier, and an attacker/malicious agent may be 'hiding' in a system to ensure that they avoid raising suspicion in an end user, such as by slowing their machine down. The AI model(s) 560 in the cyber security appliance 120 builds a sophisticated 'pattern of life'— that understands what represents normality for every person, device, and network activity in the system being protected by the cyber security appliance 120. The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The machine learning model of a pattern of life can learn "on the job" from real-world data occurring in the system and constantly evolves its understanding as the system's environment changes. The Artificial Intelligence can use machine learning algorithms to analyze patterns and 'learn' what is the 'normal behavior' of the system (network) 50 by analyzing data on the activity on the system 50 at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised learning can break down features of what it is analyzing (e.g., a network node of a device or user account), which can be useful for categorization, and then identify what else has similar or overlapping feature sets matching to what it is analyzing.

The cyber security appliance 120 can use unsupervised machine learning to works things out without pre-defined labels. In the case of sorting a series of different entities, such as different devices, the system analyzes the information and works out the different classes of devices. This allows the system 50 to handle the unexpected and embrace uncertainty when new entities and classes are examined. The modules and models of the cyber security appliance 120 do not always know what they are looking for but can independently classify data and detect compelling patterns. The cyber security appliance 120's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 120 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 120 can use a Recursive Bayesian Estimation to combine these multiple analyzes of different measures of network behavior to generate a single overall/comprehensive picture of the state of each device, the cyber security appliance 120 takes advantage of the power of Recursive Bayesian Estimation (RBE) via an implementation of the Bayes filter. Using RBE, the cyber security appliance 120's AI models are able to constantly adapt themselves, in a computationally efficient manner, as new information becomes available to the system. The AI model(s) of the cyber security appliance 120 may be configured to continually recalculate threat levels in the light of new evidence, identifying changing attack behaviors where conventional signature-based methods fall down.

Training an AI model can be accomplished by having the model learn good values for all of the weights and the bias for labeled examples created by the system, and in this case; starting with no labels initially. A goal of the training of the AI model can be to find a set of weights and biases that have low loss, on average, across all examples.

Another anomaly detection technique that can be used is an unsupervised anomaly detection that detects anomalies in an unlabeled test data set under the assumption that the majority of the instances in the data set are normal, by looking for instances that seem to fit least to the remainder of the data set. The AI model representing normal behavior from a given normal training data set can detect anomalies by establishing the normal pattern and then test the likelihood of a test instance under analysis to be generated by the AI model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

Computing Devices

Figure 8:
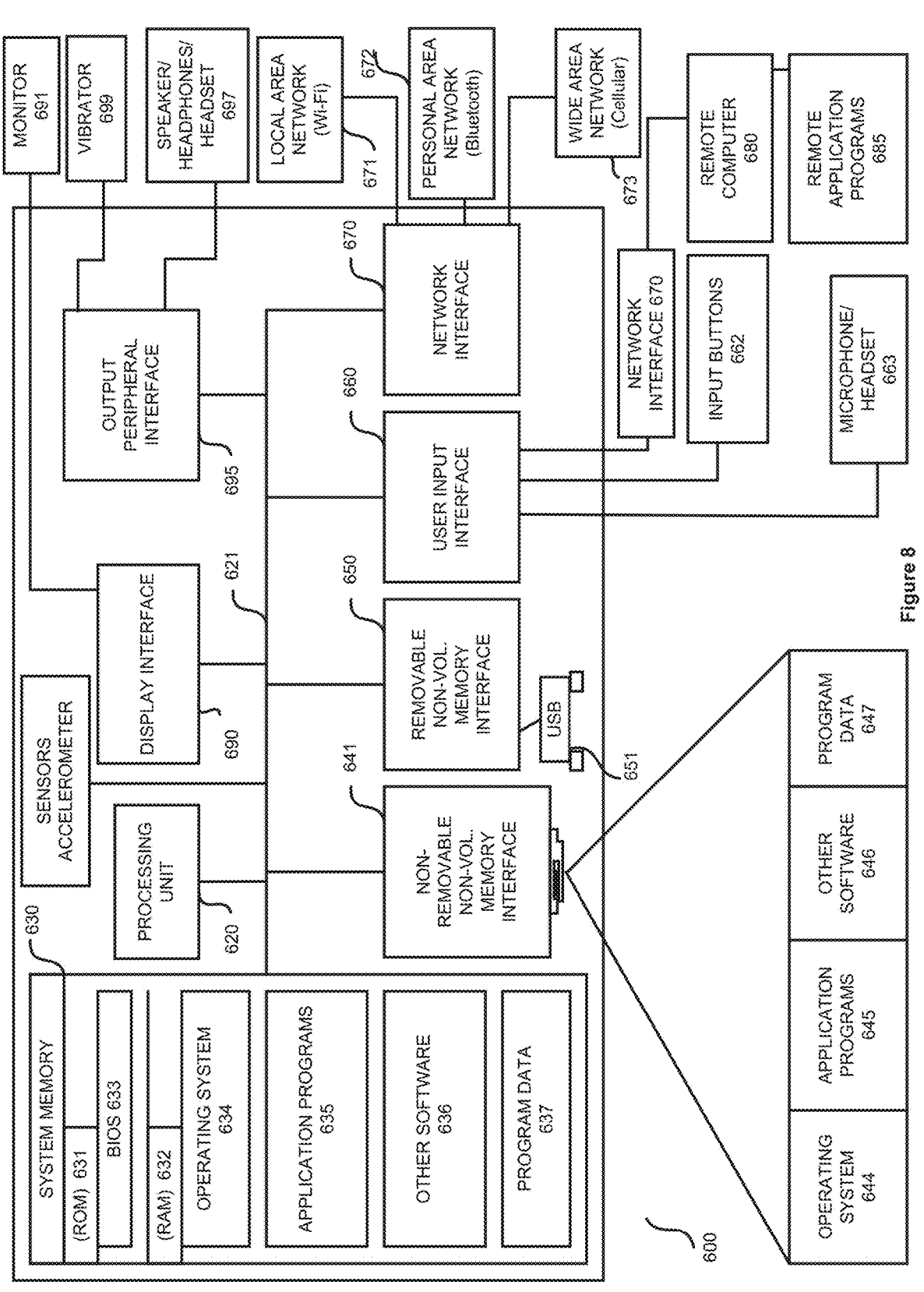
FIG. 8 illustrates a block diagram of an embodiment of one or more computing devices that can be a part of an AI-based, cyber threat defense system including the cyber security appliance, the classifier on the scalable cloud platform, and the endpoint computing devices for an embodiment of the current design discussed herein.

FIG. 8 illustrates a block diagram of an embodiment of one or more computing devices that can be a part of an AI-based, cyber threat defense system including the cyber security appliance 120, the classifier 402 on the scalable cloud platform 135, and the endpoint computing devices 101 for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processor units 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Non-transitory machine-readable media can be any available media that can be accessed by computing device 602 and includes both volatile and nonvolatile media, and removable and non-removable media. By way of example, and not limitation, non-transitory machine-readable media use includes storage of information, such as computer-readable instructions, data structures, other executable software, or other data. Non-transitory machine-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

In certain situations, each of the terms "engine," "module" and "component" is representative of hardware, firmware, and/or software that is configured to perform one or more functions. As hardware, the engine (or module or component) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic. Alternatively, or in combination with the hardware circuitry described above, the engine (or module or component) may be software in the form of one or more software modules, which may be configured to operate as its counterpart circuitry. For instance, a software module may be a software instance that operates as or is executed by a processor, namely a virtual processor whose underlying operations is based on a physical processor such as virtual processor instances for Microsoft® Azure® or Google® Cloud Services platform or an EC2 instance within the Amazon® AWS infrastructure, for example. Illustrative examples of the software module may include an executable application, a daemon application, an application programming interface (API), a subroutine, a function, a procedure, an applet, a servlet, a routine, source code, a shared library/dynamic load library, or simply one or more instructions. A module may be implemented in hardware electronic components, software components, and a combination of both. A module is a core component of a complex system consisting of hardware and/or software that is capable of performing its function discretely from other portions of the entire complex system but designed to interact with the other portions of the entire complex system. The term "computerized" generally represents that any corresponding operations are conducted by hardware in combination with software and/or firmware. The terms "computing device" or "device" should be generally construed as physical device with data processing capability, data storage capability, and/or a capability of connecting to any type of network, such as a public cloud network, a private cloud network, or any other network type. Examples of a computing device may include, but are not limited or restricted to, the following: a server, a router or other intermediary communication device, an endpoint (e.g., a laptop, a smartphone, a tablet, a desktop computer, a netbook, IoT device, networked wearable, etc.) Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. Note, many functions performed by electronic hardware components can be duplicated by software emulation. Thus, a software program written to accomplish those same functions can emulate the functionality of the hardware components in the electronic circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising: a classifier configured to 1) detect anomalous activity associated with network entities and 2) model a pattern of life of network entities through a series of machine learning models cooperating with multiple response instances and training instances which are served by a scalable cloud platform that receives data associated with processes from multiple endpoint agents, where each endpoint agent is configured to be resident on its own host endpoint computing device in a network being protected by a cyber security appliance against cyber threats, where the classifier is configured to spin up the multiple response instances to support the detection of anomalous activity associated with the network entities through the series of machine learning models and the multiple training instances to support the modeling of the pattern of life of network entities with the series of machine learning models, where the classifier is configured to spin up the multiple response instances and the multiple training instances to automatically scale an amount of response instances and an amount of training instances utilized to respond to a current data load of the data associated with the processes coming from one or more endpoint agents in the multiple endpoint agents that have their endpoint computing device connected to the network protected by a cyber security appliance against cyber threats, and where the multiple response instances are configured to classify and generate scores for events in the current data load of the data associated with the processes coming from one or more endpoint agents in the multiple endpoint agents; and subsequently, send information regarding the classification and scores for the events in the current data load of the data associated with the processes coming from the one or more endpoint agents to the cyber security appliance, where any portion of the classifier that is implemented with software, then the software is stored on one or more non-transitory machine readable mediums in an executable state, which are to be executed by one or more processors.

2. The apparatus of claim 1, where a first response instance is configured to use one or more of the machine learning models that model the pattern of life for the network entities, created by a first training instance, for comparison in a process of the generation of the scores and making inferences, where the first response instance is configured to load one or more of the machine learning models that model a pattern of life for the network entities from at least one of 1) a model storage database and 2) a cache that is part of the scalable cloud platform in order to analyze the current data associated with the processes operating on that host endpoint computing device and to then generate scores for the events in the current data load of the data associated with the processes coming from the one or more endpoint agents.

3. The apparatus of claim 2, where, after the scores are generated for the events in the current data load of the data associated with the processes coming from the one or more endpoint agents, the first response instance is further configured to both save the events with their scores to an events storage database and put one or more messages in a queue to instruct one or more training instances on which of the one or more machine learning models require training, where the first response instance then sends the information regarding the classification and scores for the events in the current data load of the data associated with the processes coming from the one or more endpoint agents over to the cyber security appliance via a server.

4. The apparatus of claim 1, where a first training instance is configured to pull instructions from a queue, load relevant machine learning models that model a pattern of life the network entities from a model storage database, and relevant events that have been analyzed by a first response instance for a first machine learning model that models a pattern of life for that specific network entity from the event storage database, and then conduct and perform machine learning training as described in the instructions for the loaded machine learning models that model a pattern of life for each of the network entities connected with the relevant events, where after the machine learning training to at least of 1) build and 2) update the loaded machine learning models that model the pattern of life for the network entities connected with the relevant events is complete, then the first training instance is configured to save the trained machine learning models back to the model storage database.

5. The apparatus of claim 1, further comprising: a data generator configured to cooperate with the classifier in the scalable cloud platform, where the data generator is configured to generate synthetic data derived from data collected by the multiple endpoint agents, where the data generator is configured to provide the synthetic data to 1) data load-test for a proposed new feature added into a first endpoint agent to test out a data loading effect on the scalable cloud platform prior to releasing the proposed new feature on the multiple endpoint agents in a field as well as 2) provide a validation check on the classifications and scores produced by a first response instance by sending in the synthetic data that has known classifications and scores.

6. The apparatus of claim 1, where the multiple training instances are configured to build and maintain the machine learning models that model the pattern of life for the network entities, where a first machine learning model that models a pattern of life for a first network entity, where the first network entity corresponds to at least one of a first individual endpoint computing device, a first individual user, and a first cluster of similar endpoint computing devices, where a second machine learning model that models a pattern of life for a second network entity corresponds to a different individual endpoint computing device, individual user, or individual cluster of similar endpoint computing devices than the first individual endpoint computing device, first individual user, or first individual cluster of similar endpoint computing devices.

7. The apparatus of claim 1, where the multiple training instances are configured to build and maintain an overall model of behavior for a group of endpoint computing devices that host similar sets of processes, where the multiple training instances are configured to build and maintain the machine learning models that model the pattern of life particularized to at least one of an individual network device and individual user for each individual network device and individual user in the network, where the multiple response instances are configured to detect the anomalous activity by a comparison to the particularized machine learning model that models the pattern of life for that an individual network device or individual user as well as to the overall model of behavior for a group of endpoint computing devices that host similar sets of processes.

8. The apparatus of claim 1, where a first endpoint agent in the multiple endpoint agents is configured to monitor processes operating on a first host endpoint computing device including launches of processes in the host endpoint computing device and then store the data associated with the processes in a non-transitory memory in the first host endpoint computing device until the first endpoint agent determines that the first host endpoint computing device is connected to an Internet, such that the first endpoint agent collects the data associated with the processes operating on the first host endpoint computing device both when the first host endpoint computing device is not connected to the network as well as when the endpoint computing device is connected to the network protected by the cyber security appliance against cyber threats.

9. The apparatus of claim 1, where a first training instance is configured to use a first clustering algorithm to create an overall model of behavior for a group of similar endpoint computing devices by i) applying a Jensen-Shannon divergence to process attributes from the processes resident in the endpoint computing devices in the network and ii) clustering process data from two or more endpoint computing devices deemed to be similar to form the group of similar endpoint computing devices.

10. The apparatus of claim 1, where the classifier in the scalable cloud platform is configured to spin up the multiple response instances and the multiple training instances so that the multiple response instances can respond to the data associated with the processes coming into the scalable cloud platform independently from an ability of the multiple training instances to at least one of i) build and ii) update the machine learning models that model the pattern of life for the network entities in the network, where one or more of the training instances are configured to analyze the multiple endpoint computing devices themselves and their resident processes to create one or more clusters of host endpoint computing devices that have similar processes resident on their corresponding host endpoint computing device.

11. A non-transitory machine-readable medium, which stores further instructions in an executable format to be executed by one or more processors to cause further operations as follows, comprising: providing a classifier to 1) detect anomalous activity and 2) model a pattern of life of network entities through a series of machine learning models cooperating with multiple response and training instances which are served by a scalable cloud platform that receives data associated with processes from multiple endpoint agents, where each endpoint agent is configured to be resident on its own host endpoint computing device in a network being protected by a cyber security appliance against cyber threats, providing the classifier to spin up the multiple response instances to support the detection of anomalous activity and the multiple training instances to support the modeling of the pattern of life of network entities through a series of machine learning models, providing the classifier to spin up the multiple response instances and the multiple training instances to automatically scale an amount of response instances and an amount of training instances utilized to respond to a current data load of the data associated with the processes coming from one or more endpoint agents in the multiple endpoint agents that have their endpoint computing device connected to the network protected by a cyber security appliance against cyber threats, and providing the multiple response instances to classify and generate scores for events in the current data load of the data associated with the processes coming from one or more endpoint agents in the multiple endpoint agents, and subsequently send information regarding the classification and scores for the events in the current data load of the data associated with the processes coming from the one or more endpoint agents to the cyber security appliance, where any portion of the classifier that is implemented with software, then the software is stored on one or more non-transitory machine readable mediums in an executable state, which are to be executed by one or more processors.

12. The non-transitory machine-readable medium of claim 11, which stores further instructions in the executable format to be executed by one or more processors to cause further operations as follows, comprising: providing a first response instance to use one or more of the machine learning models that model the pattern of life for the network entities, saved by a first training instance, for comparison in a process of the generation of the scores and making inferences, where the first response instance is configured to load one or more of the machine learning models that model a pattern of life for the network entities from at least one of 1) a model storage database and 2) a cache in order to analyze the current data associated with the processes operating on that host endpoint computing device and to then generate scores for the events in the current data load of the data associated with the processes coming from the one or more endpoint agents.

13. The non-transitory machine-readable medium of claim 12, which stores further instructions in the executable format to be executed by one or more processors to cause further operations as follows, comprising: providing, after the scores are generated for the events in the current data load of the data associated with the processes coming from the one or more endpoint agents, the first response instance to both save the events with their scores to an events storage database and put one or more messages in a queue to instruct one or more training instances on which of the one or more machine learning models require training, where the first response instance then sends the information regarding the classification and scores for the events in the current data load of the data associated with the processes coming from the one or more endpoint agents over to the cyber security appliance via a server.

14. The non-transitory machine-readable medium of claim 11, which stores further instructions in the executable format to be executed by one or more processors to cause further operations as follows, comprising: providing a first training instance to pull instructions from a queue, load relevant machine learning models that model a pattern of life the network entities from a model storage database, and relevant events that have been analyzed by a first response instance for a first machine learning model that models a pattern of life for that specific network entity from the event storage database, and then conduct and perform machine learning training as described in the instructions for the loaded machine learning models that model a pattern of life for each of the network entities connected with the relevant events, where after the machine learning training to at least of 1) build and 2) update the loaded machine learning models that model the pattern of life for the network entities connected with the relevant events is complete, then the first training instance is configured to save the trained machine learning models back to the model storage database.

15. The non-transitory machine-readable medium of claim 11, which stores further instructions in the executable format to be executed by one or more processors to cause further operations as follows, further comprising: providing a data generator to cooperate with the classifier in the scalable cloud platform, providing the data generator to generate synthetic data derived from data collected by the multiple endpoint agents, where the data generator is configured to provide the synthetic data to 1) data load-test for a proposed new feature added into a first endpoint agent to test out a data loading effect on the scalable cloud platform prior to releasing the proposed new feature on the multiple endpoint agents in a field as well as 2) provide a validation check on the classifications and scores produced by a first response instance by sending in the synthetic data that has known classifications and scores.

16. The non-transitory machine-readable medium of claim 11, which stores further instructions in the executable format to be executed by one or more processors to cause further operations as follows, comprising: providing the multiple training instances to build and maintain the machine learning models that model the pattern of life for the network entities, where a first machine learning model that models a pattern of life for a first network entity, where the first network entity corresponds to at least one of a first individual endpoint computing device, a first individual user, and a first cluster of similar endpoint computing devices, where a second machine learning model that models a pattern of life for a second network entity corresponds to a different individual endpoint computing device, individual user, or individual cluster of similar endpoint computing devices than the first individual endpoint computing device, first individual user, or first individual cluster of similar endpoint computing devices.

17. The non-transitory machine-readable medium of claim 11, which stores further instructions in the executable format to be executed by one or more processors to cause further operations as follows, comprising: providing the multiple training instances to build and maintain an overall model of behavior for a group of endpoint computing devices that host similar sets of processes, where the multiple training instances are configured to build and maintain the machine learning models that model the pattern of life particularized to at least one of an individual network device and individual user for each individual network device and individual user in the network, where the multiple response instances are configured to detect the anomalous activity by a comparison to the particularized machine learning model that models the pattern of life for that an individual network device or individual user as well as to the overall model of behavior for a group of endpoint computing devices that host similar sets of processes.

18. The non-transitory machine-readable medium of claim 11, which stores further instructions in the executable format to be executed by one or more processors to cause further operations as follows, comprising: providing a first endpoint agent in the multiple endpoint agents to monitor processes operating on a first host endpoint computing device including launches of processes in the host endpoint computing device and then store the data associated with the processes in a non-transitory memory in the first host endpoint computing device until the first endpoint agent determines that the first host endpoint computing device is connected to an Internet, such that the first endpoint agent collects the data associated with the processes operating on the first host endpoint computing device both when the first host endpoint computing device is not connected to the network as well as when the endpoint computing device is connected to the network protected by the cyber security appliance against cyber threats.

19. The non-transitory machine-readable medium of claim 11, which stores further instructions in the executable format to be executed by one or more processors to cause further operations as follows, comprising: providing a first training instance to use a first clustering algorithm to create an overall model of behavior for a group of similar endpoint computing devices by applying a Jensen-Shannon divergence to process attributes from the processes resident in the endpoint computing devices in the network and clustering process data from two or more endpoint computing devices deemed to be similar to form the group of similar endpoint computing devices.

20. The non-transitory machine-readable medium of claim 11, which stores further instructions in the executable format to be executed by one or more processors to cause further operations as follows, comprising: providing the classifier in the scalable cloud platform to spin up the multiple response instances and the multiple training instances so that the multiple response instances can respond to the data associated with the processes coming into the scalable cloud platform independently from an ability of the multiple training instances to at least one of i) build and ii) update the machine learning models that model the pattern of life for the network entities in the network, where one or more of the training instances are configured to analyze the multiple endpoint computing devices themselves and their resident processes to create one or more clusters of host endpoint computing devices that have similar processes resident on their corresponding host endpoint computing device.

* * * * *